United States Patent
Endrasik

(10) Patent No.: US 9,688,212 B2
(45) Date of Patent: Jun. 27, 2017

(54) MODULAR TRAILER-HITCH UTILITY SYSTEM

(71) Applicant: Poly A. Endrasik, Commerce Township, MI (US)

(72) Inventor: Poly A. Endrasik, Commerce Township, MI (US)

(*) Notice: Subject to any disclaimer, the term of this patent is extended or adjusted under 35 U.S.C. 154(b) by 49 days.

(21) Appl. No.: 14/678,952

(22) Filed: Apr. 4, 2015

(65) Prior Publication Data
US 2016/0288726 A1    Oct. 6, 2016

(51) Int. Cl.
| | |
|---|---|
| *B60R 9/06* | (2006.01) |
| *B66C 23/44* | (2006.01) |
| *B60Q 1/26* | (2006.01) |
| *B60Q 1/30* | (2006.01) |
| *B60Q 1/50* | (2006.01) |
| *B60D 1/07* | (2006.01) |
| *B60D 1/52* | (2006.01) |

(52) U.S. Cl.
CPC ............... *B60R 9/06* (2013.01); *B60D 1/075* (2013.01); *B60D 1/52* (2013.01); *B60Q 1/2661* (2013.01); *B60Q 1/305* (2013.01); *B60Q 1/50* (2013.01); *B66C 23/44* (2013.01)

(58) Field of Classification Search
CPC .. B60R 3/007; B60R 9/06; B60D 1/00; B60D 2001/008; B60D 1/01; B60D 1/02; B60D 1/07; B60D 1/075; B60D 1/167; B60D 1/675; B60D 1/173
USPC ....... 224/521, 500, 502, 503, 505, 506, 508, 224/511, 519
See application file for complete search history.

(56) References Cited

U.S. PATENT DOCUMENTS

| | | | | |
|---|---|---|---|---|
| 3,796,333 A | * | 3/1974 | Goldstein | B60D 1/52 224/509 |
| 3,801,134 A | * | 4/1974 | Dees | B60D 1/07 280/416.1 |
| 4,204,702 A | * | 5/1980 | Oltrogge | B60D 1/075 280/491.5 |
| 4,614,354 A | * | 9/1986 | Stagner | B60D 1/143 280/415.1 |
| 4,640,658 A | * | 2/1987 | Webb, Jr. | B60R 9/06 224/497 |
| 4,725,068 A | * | 2/1988 | Taylor | B60D 1/00 172/248 |
| 4,915,276 A | * | 4/1990 | Devito | B60R 9/06 224/500 |
| 5,215,234 A | * | 6/1993 | Pasley | B60R 9/06 224/508 |
| 5,460,304 A | * | 10/1995 | Porter | B60R 9/06 224/485 |

(Continued)

*Primary Examiner* — Brian D Nash
(74) *Attorney, Agent, or Firm* — Thomas P. Heed

(57) ABSTRACT

A reconfigurable utility system that is mountable to a standard trailer hitch. The utility system has small basic units that can be temporarily combined to make members and connections. The connections can be fixed or pivoting. The members can be oriented both parallel and orthogonal (although not necessarily intersecting) to the hitch. The utility system is constructed from durable materials such as steel, aluminum, polycarbonate, polypropylene, or high-density polyethylene ("HDPE"). The utility system components can have a square cross-sectional mating area, so that it is most easily integrated with a standard trailer hitch.

22 Claims, 27 Drawing Sheets

(56) References Cited

U.S. PATENT DOCUMENTS

| | | | | |
|---|---|---|---|---|
| 5,465,993 A * | 11/1995 | Gee | B60D 1/143 280/475 |
| 5,518,156 A * | 5/1996 | Lehman | B60N 3/16 224/281 |
| 5,649,656 A * | 7/1997 | Davy | B60P 3/1025 224/405 |
| 6,070,926 A * | 6/2000 | Hardin | B60P 3/40 224/518 |
| 6,089,431 A * | 7/2000 | Heyworth | B60D 1/075 224/521 |
| 6,244,483 B1 * | 6/2001 | McLemore | B60R 9/06 224/521 |
| 6,314,891 B1 * | 11/2001 | Larson | A47B 3/14 108/44 |
| 6,428,031 B1 * | 8/2002 | McCoy | B60D 1/075 224/519 |
| 6,511,088 B2 * | 1/2003 | Kahlstorf | B60D 1/075 224/521 |
| 6,585,285 B2 * | 7/2003 | Koch | B62D 63/061 224/924 |
| 6,662,983 B2 * | 12/2003 | Lane | B60R 9/06 108/44 |
| 6,742,799 B1 * | 6/2004 | Hansen | B60D 1/485 280/416.1 |
| 6,802,441 B1 * | 10/2004 | DuRant | B60R 9/065 224/513 |
| 6,817,503 B2 * | 11/2004 | McCoy | B60D 1/485 224/518 |
| 7,823,906 B2 * | 11/2010 | Darling, III | A61G 1/013 280/47.18 |
| 7,891,697 B1 * | 2/2011 | Fahrbach | B62D 63/061 280/656 |
| 8,191,921 B2 * | 6/2012 | Hyde | B62D 63/061 280/652 |
| 8,276,932 B2 * | 10/2012 | Columbia | B60D 1/06 280/495 |
| 8,371,603 B2 * | 2/2013 | Columbia | B60D 1/06 280/504 |
| 8,464,460 B1 * | 6/2013 | Runyan | F41J 1/00 280/656 |
| 8,820,598 B2 * | 9/2014 | Tennyson | B60R 9/065 224/509 |
| 9,096,105 B1 * | 8/2015 | Spiller | B60D 1/06 |
| 2015/0110594 A1 * | 4/2015 | Descoteaux | B60P 3/14 414/800 |
| 2016/0243996 A1 * | 8/2016 | Anton | B60R 9/06 |

* cited by examiner

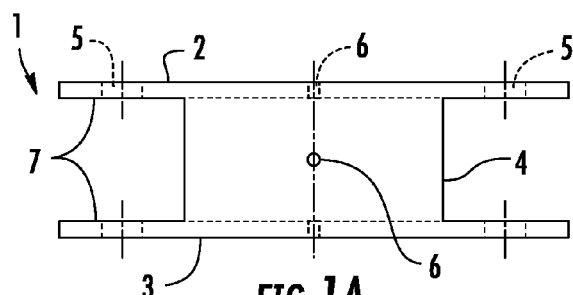
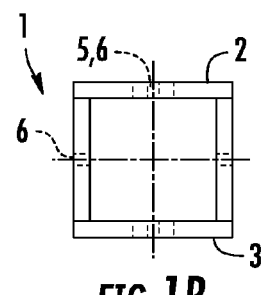
FIG. 1A    FIG. 1B
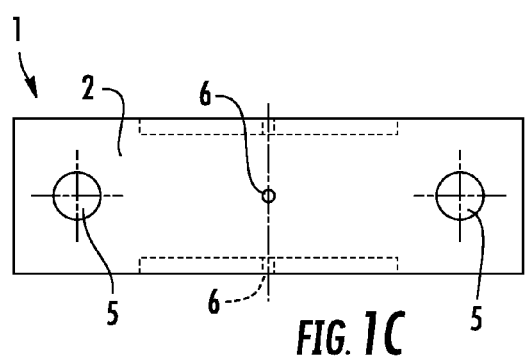
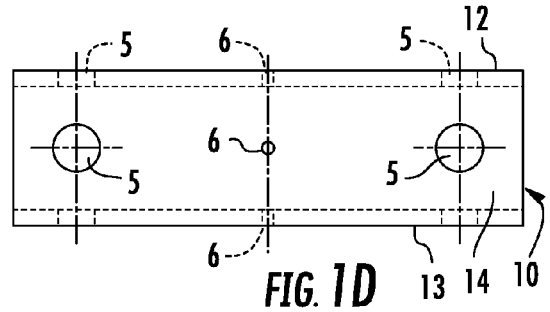
FIG. 1C    FIG. 1D
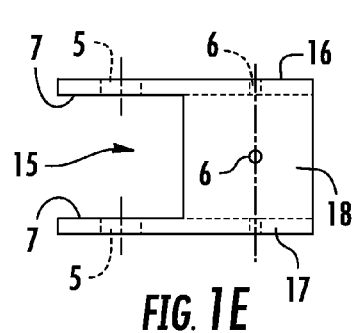
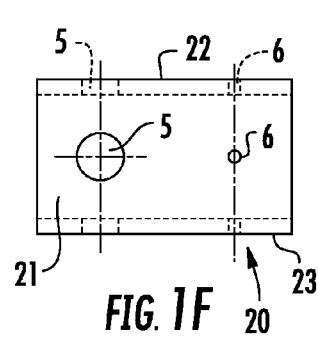
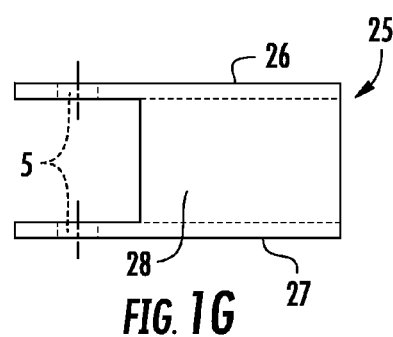
FIG. 1E    FIG. 1F    FIG. 1G
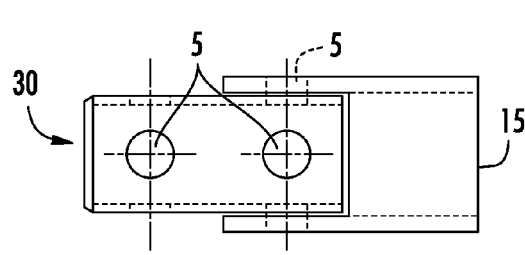
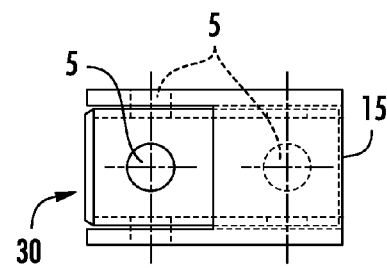
FIG. 1H    FIG. 1I

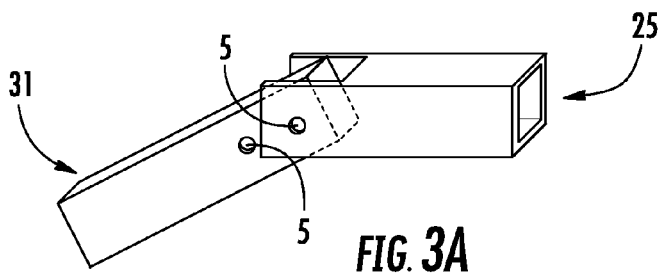
FIG. 3A
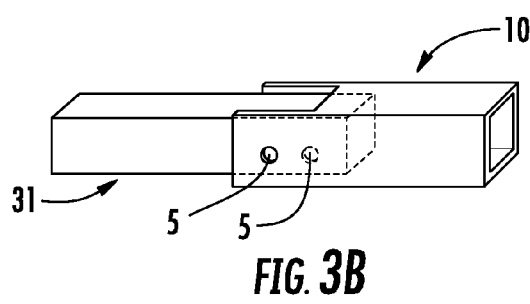
FIG. 3B
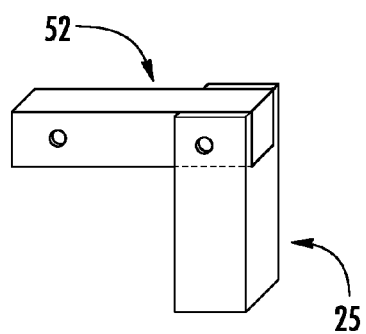
FIG. 3C
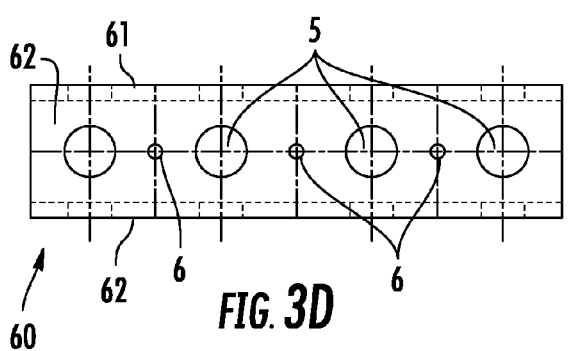
FIG. 3D
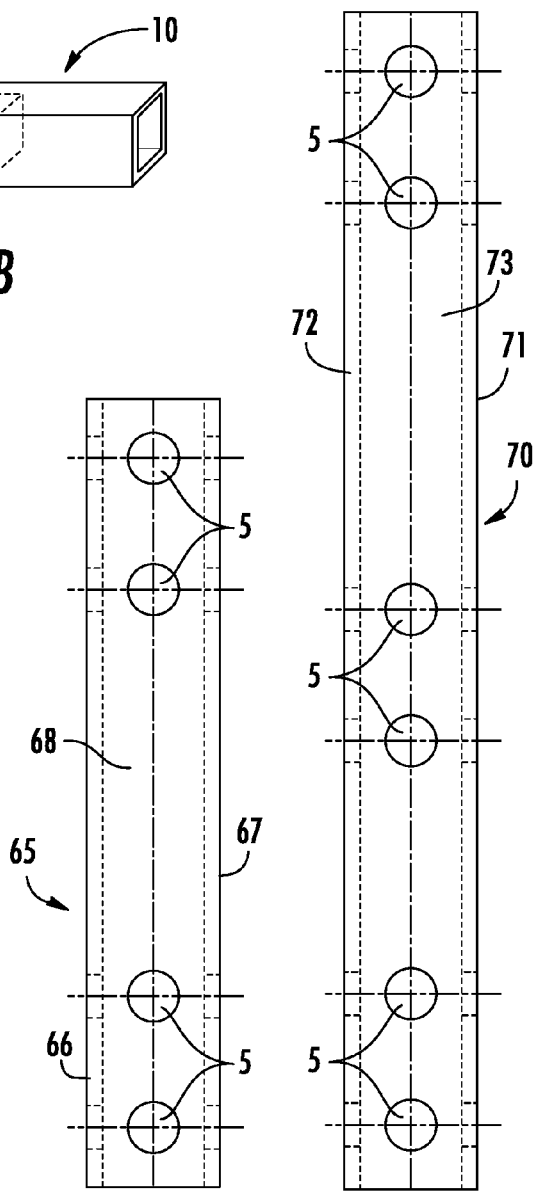
FIG. 3E
FIG. 3F

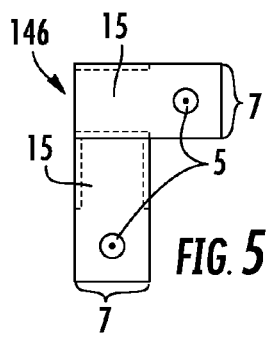
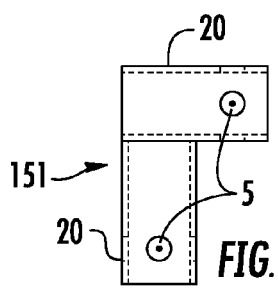
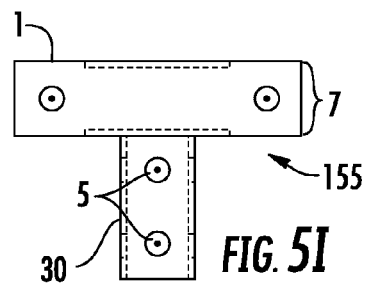
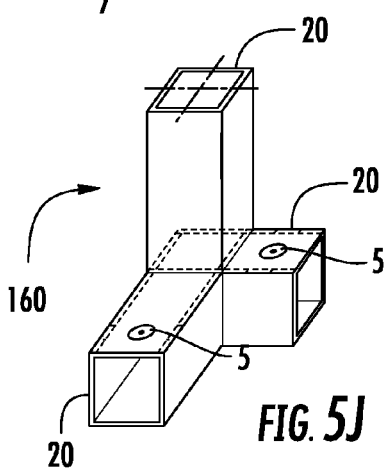
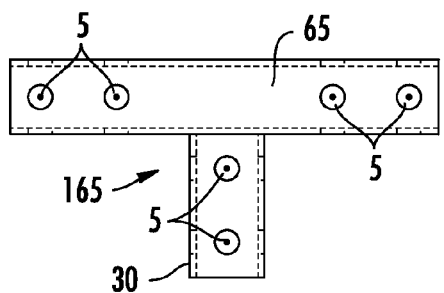
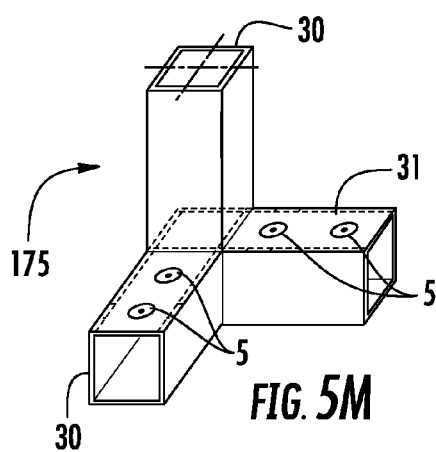
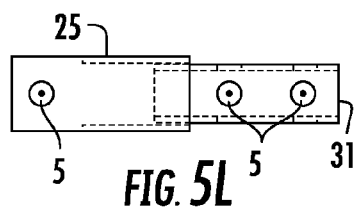
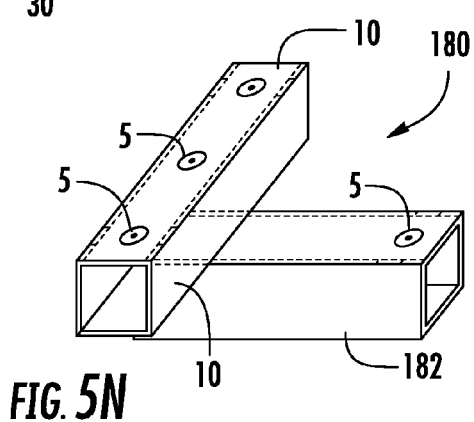
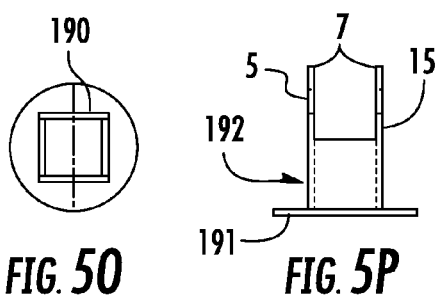

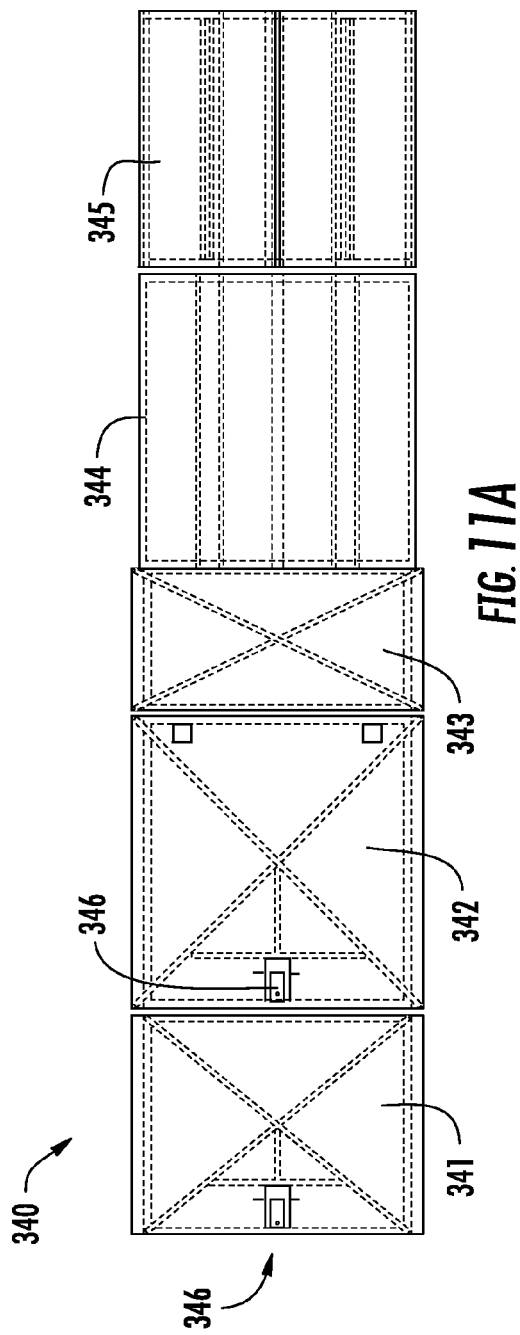
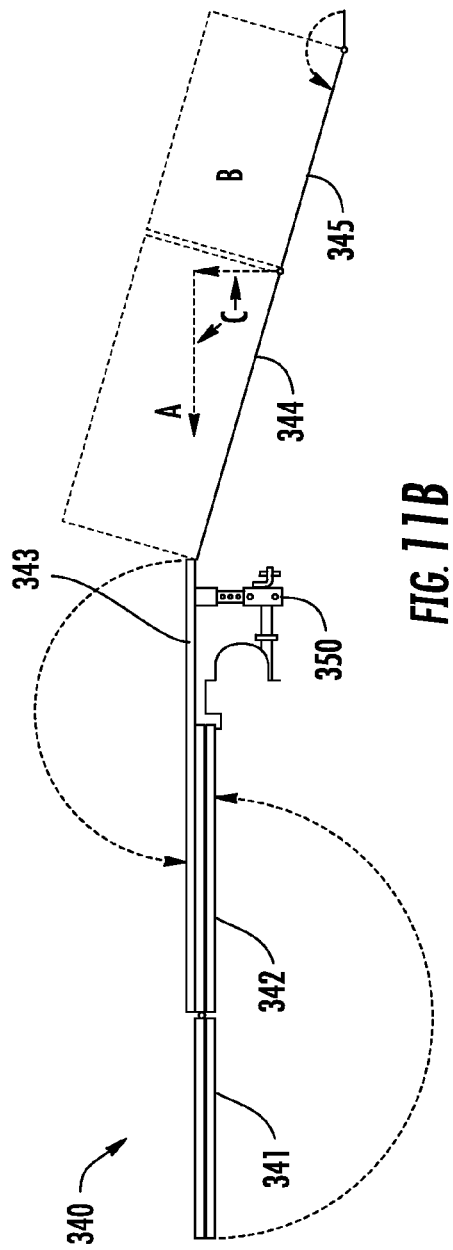
FIG. 11A
FIG. 11B

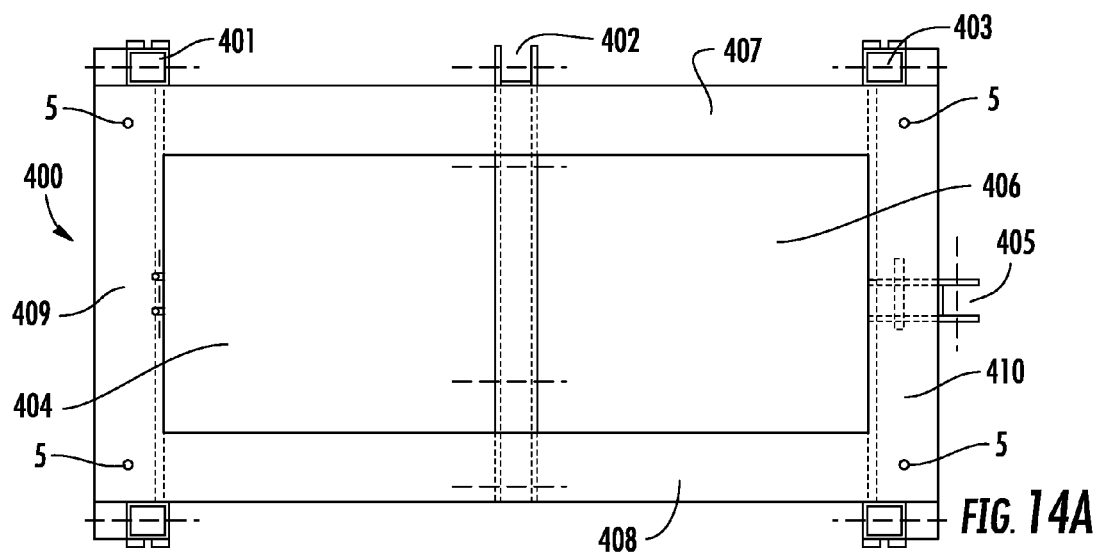
FIG. 14A
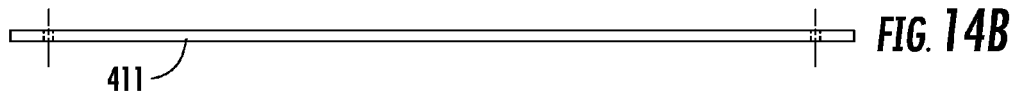
FIG. 14B
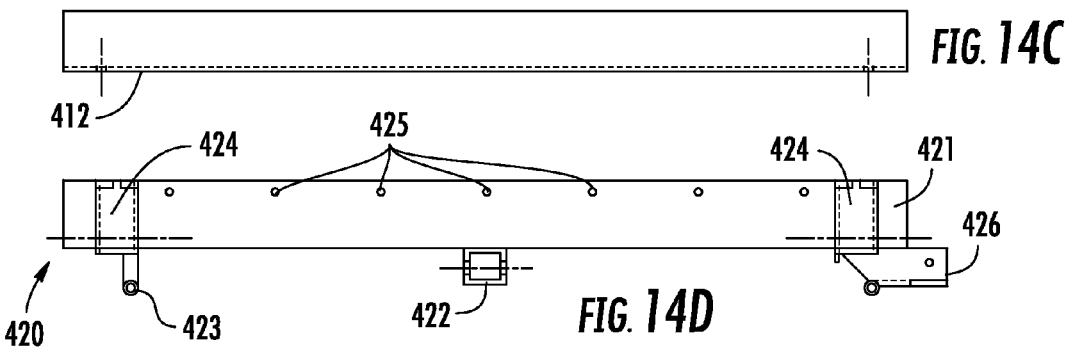
FIG. 14C
FIG. 14D
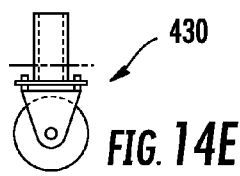
FIG. 14E
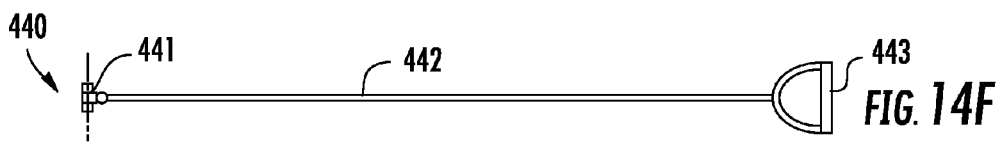
FIG. 14F
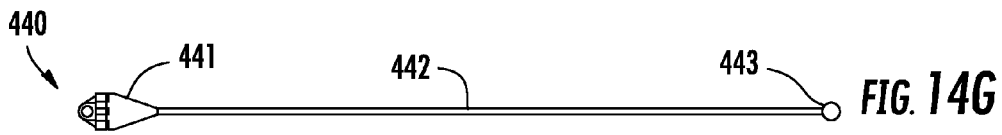
FIG. 14G

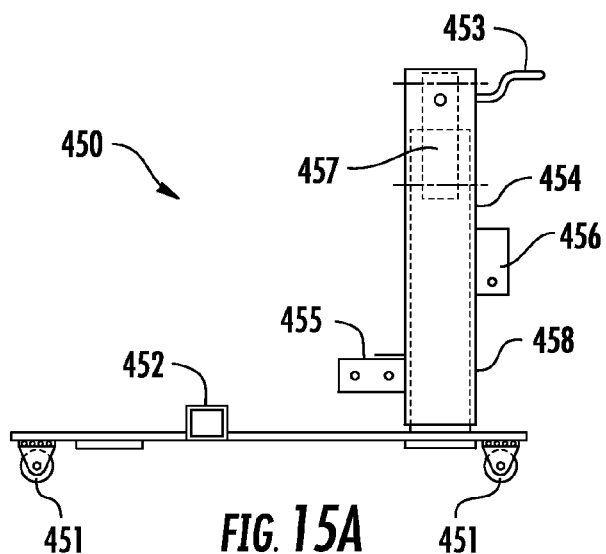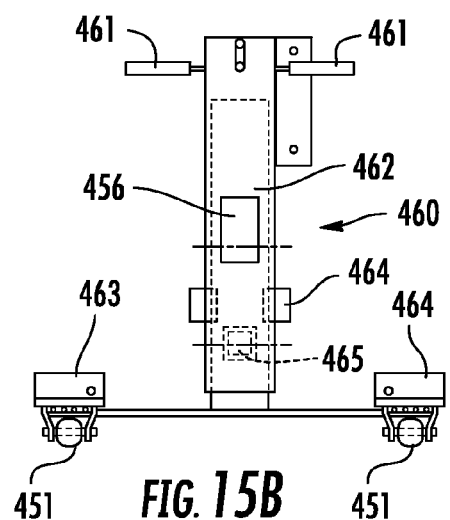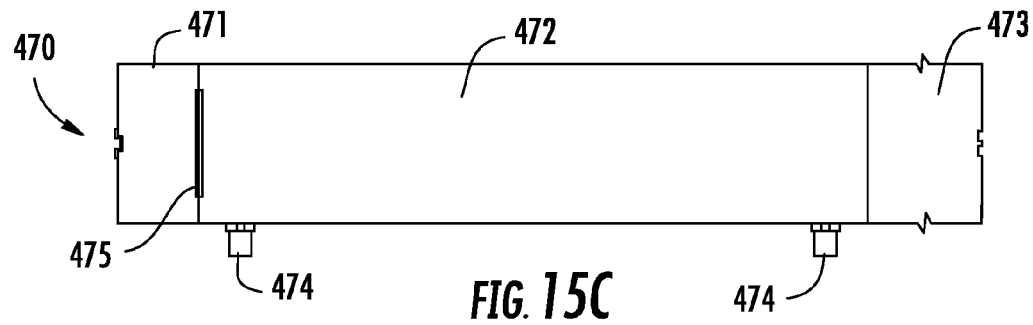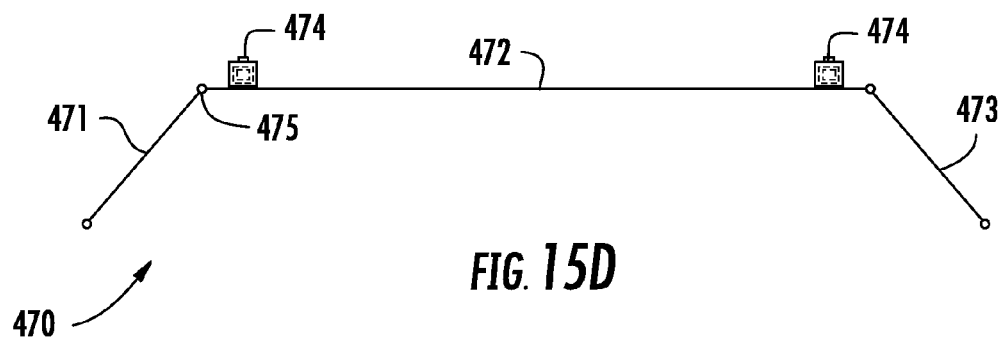

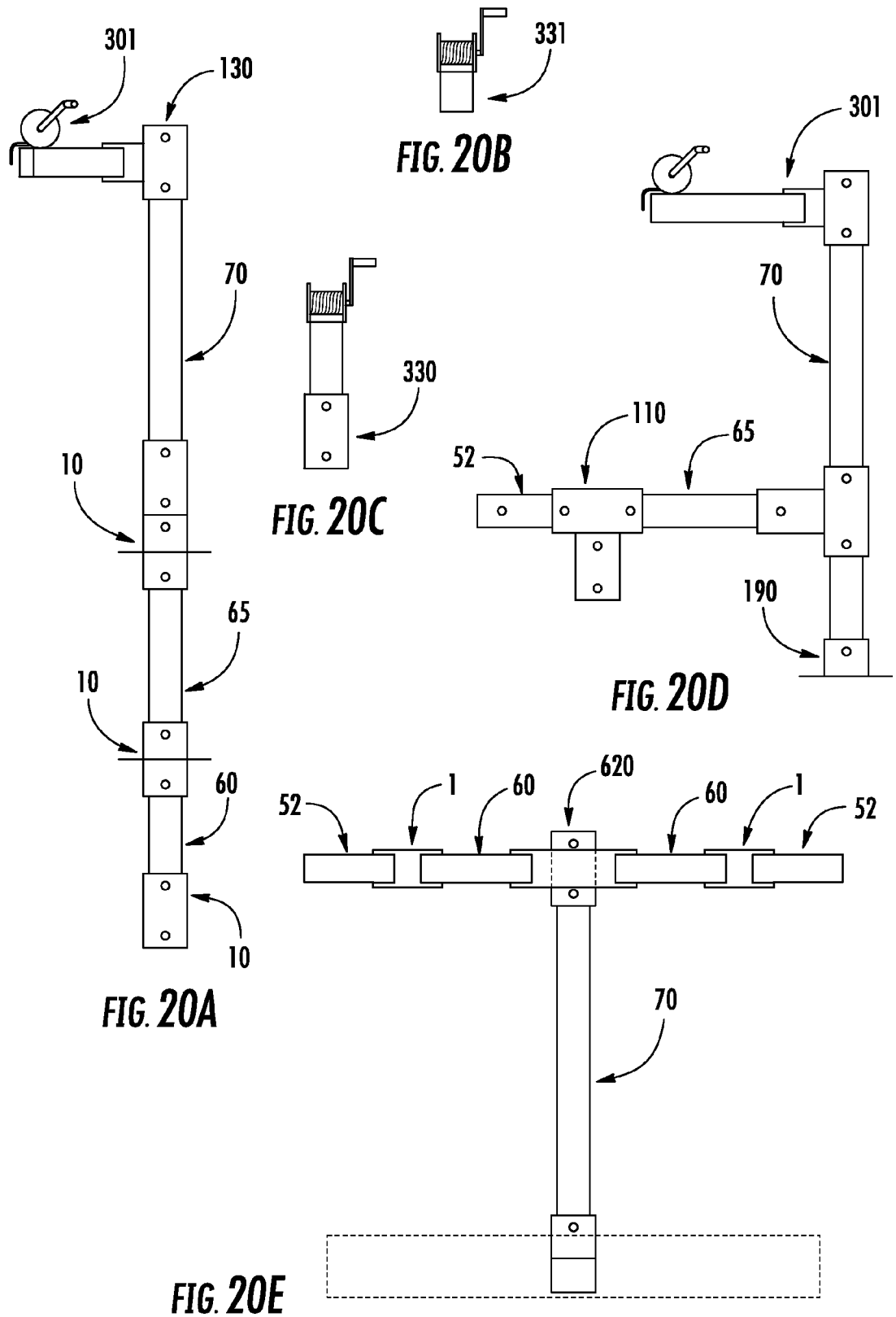

MODULAR TRAILER-HITCH UTILITY SYSTEM

FIELD OF INVENTION

This invention relates to the class of land vehicles and the sub-classes of articulated and/or extensible vehicles. Specifically, the present invention relates to a system of buildable components which can be modularly assembled to create members that can articulate, pivot, and extend off of a standard trailer-hitch.

BACKGROUND OF INVENTION

Many people have vocations or avocations that take them outdoors or to remote sites. Hunters, fishers, boat owners, jet-ski owners, hikers, mountain climbers, and other various sportsman transport gear into often remote locations. Likewise, carpenters, painters, landscapers, ranchers, farmers, and other workers perform outdoor labor, needing to transport gear and tools to job-sites.

To accommodate both sportsman and workers, there are a variety of tools and solutions for transporting gear, usually involving pick-up trucks, utility vehicles, trailers, and the like. Once on site, both groups are dependent on terrain in order to assemble and use their gear or tools. Often, the tools or gear needed changes, depending on the job or sport being performed and the terrain encountered. Additionally, work-surfaces at remote sites are often at a premium for both groups.

If a sportsman has multiple outdoor avocations, they often require multiple sets of gear, trailers, and work-surfaces. Additionally, those with outdoor vocations are often required to purchase multiple trailers and work-surfaces to accommodate a variety of tools and terrains. For both groups, the expense of redundant trailers and portable work-surfaces is substantial, and can create logistical problems. Such single-use equipment is expensive and limits the sportsperson or worker to using one single solution.

Both outdoorsman and manual laborers working out of doors need a modular system that can be tailored and re-configured for their transportation, sporting and/or work needs. Ideally, such a system would entail a set of interchangeable parts that could joined or mated, temporarily, creating members that would articulate, pivot and extend. Such members could create a variety of utility trailers, platforms and baskets to accommodate the transport of various gear for both a sportsman and workman. Additionally, such members could be re-configured and used to create a variety of work surfaces, benches, racks, platforms, and baskets in situ. In order to be of maximum utility, such a system should allow tool-free assembly and re-configuration while on-site. In essence, both sportspersons and workers need a system that functions as an adult-version of an Erector® set or Lego® building blocks.

PRIOR ART REVIEW

The market has attempted to address this need with many imperfect solutions. A survey of the current prior art shows several attempts to address the problem, all without success. For example, U.S. Pat. No. 8,276,932 by named inventors Columbia, granted in 2013, is entitled, "Multi-task trailer hitch assembly" ("Columbia '932"). Columbia '932 discloses a hitch assembly that has a lower trailer ball hitch assembly and an upper assembly, located above and to the rear of the lower trailer ball hitch assembly. Columbia '932 teaches a system that allows the user to simultaneously attach a trailer to the lower ball hitch assembly while using the upper assembly to attach a platform or carrying basket. Columbia '932 teaches only a hitch assembly allowing for the simultaneous attachment of a trailer and platform or basket. Columbia '932 does not teach or disclose a system that allows the user to pivot, extend, or articulate members in order to create benches, trailers, platforms, baskets, racks, or other utilitarian constructs. Columbia '932 is a fixed solution, in that the invention, itself, is not transformative (See Columbia '932 FIG. 1 or FIG. 2A). Columbia '932 does not solve the problem that sportspersons and workers have to purchase, store, and transport single-use equipment.

U.S. Pat. No. 8,371,603 by named inventor Columbia, issued in 2013, entitled, "Maximum security/maximum versatility ball mount assembly" ("Columbia '603") is a variation and expansion of Columbia '932. Like Columbia '932, Columbia '603 teaches a hitch assembly that has a lower trailer ball hitch assembly and an upper assembly, located above and to the rear of the lower trailer ball hitch assembly. Columbia '603 has, as its purpose, the ability to allow a user to simultaneously attach a trailer to the lower ball hitch assembly while using the upper assembly to attach a platform or carrying basket. Columbia '603 uses 57 figures to express, in exquisite detail, the various embodiments of the shank and ball. For the purposes of the present invention, the primary difference between Columbia '932 and Columbia '603 is that Columbia '603 allows the top platform attachment to be closer to the vehicle, while Columbia '932 has the top platform attachment further away from the towing vehicle. Columbia '603 teaches only a hitch assembly allowing for the simultaneous attachment of a trailer and platform or basket. Columbia '603 does not teach or disclose a system that allows the user to pivot, extend, or articulate members in order to create benches, trailers, platforms, baskets, racks, or other utilitarian constructs. Columbia '603 is a fixed solution, in that the invention, itself, is not transformative. Like Columbia '932, Columbia '603 does not solve the problem that sportspersons and workers have to purchase, store, and transport single-use equipment.

Another attempt to address this market need is U.S. Pat. No. 8,191,921 by named inventor Hyde, granted 2012, and entitled, "Folding, re-configurable, expandable, multi-purpose, portable, utility trailer" ("Hyde '921"). Hyde '921 discloses two-wheeled trailer that can have its platform length adjusted. Hyde '921 is comprised of configurable axles; hinged deck panels; removable, fixed-length legs; and heating elements. The Hyde '921 system can also be re-configured to be a bench, table, chair, cargo platform, or stove. Additionally, Hyde '921 teaches that such a system can be folded for easy storage. The invention disclosed by Hyde '921 would be of limited use in providing on-site benches, tables or chairs. The Hyde '921 system has fixed-length legs, meaning that any on-site bench, table or chair would wobble unless the ground was flat. The bench, table and chairs also have a very wide length and short width, making for an unstable aspect ratio. Lastly, the Hyde '921 system shows a cargo platform without any sides. Often times, people who are going sporting out of doors, and workers going to a job site require a cargo box to hold smaller items. The Hyde '921 system has several good aspects, but would not be user-friendly, because of the reasons stated, above.

U.S. Pat. No. 6,742,799 by named inventor Hansen, granted in 2004, entitled "Hitch adapter" ("Hansen '799"), discloses hitch adapter that allows the user to attach one accessory to a standard towing hitch, such as a bicycle carrier, a motorcycle carrier, a platform for hauling cargo, a lift platform, a storage compartment, a truck bed extenders or a roof rack extender. Hansen '799 teaches that by using a cross-bar attached to the mating end of a hitch, one can provide the structure needed to attach said accessories. Hansen '799 teaches a configurable system, in that it can be used to attach a variety of accessories to the towing hitch. However, Hansen '799 does not claim any of those accessories. Additionally, Hansen '799 does not teach anything that would allow for a re-configurable utility system on a job site or other outdoor location. Hansen '799 is merely directed to the mechanics of attaching said accessories to a standard trailer hitch.

U.S. Pat. No. 6,585,285 by named inventor Koch, issued in 2003, entitled "Modular load transporting trailer" ("Koch '285"), discloses a folding trailer that can be put into luggage. Koch '285 is comprised of two lateral frame sections, associated wheels, and a trailer hitch. The wheels and lateral frame can be disassembled and folded together, so that the trailer is portable. An alternative embodiment of Koch '285 shows a bike mounting assembly connected to one of the lateral frame sections. Koch '285 does not disclose components that can be assembled into members that pivot, extend and articulate. Koch '285 does not disclose any type of on-site utility table, bench, chair or other accessory. The components claimed by Koch '285 are fixed and non-transformative.

U.S. Pat. No. 8,464,460 by named inventor Runyan, issued in 2013, entitled "Transportable shooting bench and target" ("Runyan '460), discloses a trailer-mounted shooting bench with a detachable target. Runyan '460 teaches a shooting bench with a mount on which the shooter would steady his or her gun. Runyan '460 shows a detachable shoot target, fabricated with tube steel, with legs that can be adjusted up and down using holes and pins in the tube steel. Runyan '460 teaches that the detachable shooting target can be stored, during towing, in the shooting bench, said bench having a hinged lid that can be raised and lowered. Runyan '460 does not teach or disclose a system that can be reconfigured on-site. Runyan '460 does not teach or disclose components that can be built into members that pivot, extend and articulate. Other than shooting, Runyan '460 does not teach or disclose a system suitable for use as a work bench, table, rack, or other utilitarian application.

U.S. Pat. No. 7,891,697 by named inventor Fahrbach, issued in 2011, entitled, "Trailer having a folding and load bearing platform" ("Fahrbach '697") discloses a trailer folding load-bearing platform. Fahrbach '697 is comprised of a center, forward, and rearward load bearing surfaces, connected together in such as way as to transmit the load to the axles, attached to the center section. Fahrbach '697 shows that the front and rearward platforms can be folded onto the center platform. Fahrbach '697 further teaches that the front and rearward platforms are connected to the center platform. Fahrbach '697 does not teach or disclose a system that can be reconfigured on-site. Fahrbach '697 does not teach or disclose components that can be built into members that pivot, extend and articulate. Fahrbach '697 does not disclose any manner of utility system, other than a trailer.

U.S. Pat. No. 7,823,906 by named inventor Darling, issued in 2010, entitled, "Mission adaptable portable cart/utility table arrangement" ("Darling '906") discloses a portable cart that can be tasked to transport a small boat, a coffin, a dead animal (such as a deer), a stretcher, or cargo. Darling '906 teaches that the invention can be re-configured as an operating room gurney, or as a table for triage or operating. Darling '906 is comprised of a modular load support member, a plurality of axle struts, axles, a carrier, drawers, and the like. Darling '906 is re-configurable and modular. However, Darling '906 is of limited utility, because it is only configurable and modular to a certain extent: Darling '906 teaches a structure for the cart/utility table that does not vary. Rather, the load placed on top of the structure changes, and the wheels can be inter-changed with fixed feet to create a table. Darling '906 does not teach a system wherein the structural members can be consistently re-configured by adding, subtracting, or substituting standard building parts, creating solutions which can pivot, extend, and articulate. Darling '906 has fixed structural members, which limits the configurations that can be made.

Remote hunting and fishing sites demand a solution that can be tailored to a sportsperson's individual needs for gear and transport. Likewise, many outdoor vocations demand a solution that can be tailored to the worker's individual needs for gear and transport. The market is still searching for a solution that has re-configurable structural members that allow the user to fashion individualized utility solutions. Re-configurable structural members are the building blocks from which a truly customizable utility solution is built.

SUMMARY OF THE INVENTION

This Summary discloses the basic idea of the invention, and provides a description of a suitable, typical, implementation. The present invention improves and expands upon the current prior art by teaching a utility system that is (1) mountable to a standard trailer hitch; and (2) re-configurable. The system has building blocks that are combined to make various connectors. The connectors, in turn, can be combined with lumber, extension pieces, or both, to create members which extend, pivot, and articulate with respect to the trailer hitch. The members can be combined with other member and connectors to make structures. The structures can be augmented with optional accessories.

The building blocks are fabricated from tube steel, aluminum, polycarbonate, polypropylene, or high-density polyethylene ("HDPE"). There are both male and female building blocks. The male building blocks can be inserted into the female building blocks. The following is a description of current envisioned embodiment of the standard set of Female Building Blocks, although other sets are possible.

The standard set of Female Building Blocks has been designated as follows: X1, X2, X3, X3L, X4, and X4L. The building block designated as X1 has a square cross section. The top face and the bottom face of X1 extend past the side faces. The building block designated X2 is the same overall length as X1, and the top, bottom, and side faces of X2 are all equal. Like X1, X2 has a square cross section. The building block designated X3 is exactly one half of X1, with one end having the top, bottom and side surfaces flush with one another, and the other end having the top and bottom surface extending past the side surfaces. The building block X3L is like X3, but is extended in length. The building block X4 is one half the length of X2, and is identical to one-half of X2 cut widthwise at the centerline. The building block X4L is like X4, but is extended in length.

The standard set of Male Building Blocks has been designated as follows: Y1 and Y1L. All sides of Y1 and Y1L are of equal length, although Y1L is longer than Y1. The Male Building Blocks nest inside of the Female Building Blocks. They have through holes, called connector holes, sized to standard hitch pins. The Male Building Blocks and the Female Building Blocks can be temporarily attached using hitch pins through the connector holes. The temporary attachment can either be fixed or allow pivoting.

The Building Blocks can be permanently combined to make Connectors. The Connectors have mating ends. The mating ends can allow for fixed connection or pivoting connection. The Connectors are configured as an "L", a "T", or an "X". An "L" Connector has two mating ends; A "T" Connector has three mating ends; An "X" Connector has four mating ends. The mating ends are either parallel or perpendicular to one another.

There are Extenders, which are sized to mate with either Female Building Blocks or Male Building Blocks. The Extenders are members. The Building Blocks, Connectors, and Extenders can be temporarily joined to make members that are attached parallel with one another, or orthogonal with one another. The connections can be fixed or pivoting.

These components can be combined to make useful structures. They can be combined with lumber, lumber adapters, and hitch anchor shafts to temporarily to make a wider variety of utilitarian structures.

BRIEF DESCRIPTION OF THE DRAWINGS

The invention is illustrated in Drawings FIG. 1-27. Drawing 1A shows a front view of a tube-steel sub assembly designated Female Building Block X1; Drawing 1B shows an end view of Female Building Block X1; Drawing 1C shows a top view of Female Building Block X1. Drawing 1D shows a front view of a tube-steel sub-assembly designated Female Building Block X2. Drawing 1E shows a front view of a tube-steel sub-assembly designated Female Building Block X3. Drawing 1F shows a front view of a tube-steel sub-assembly designated Female Building Block X4. Drawing 1G shows a front view of a tube-steel sub-assembly designated Female Building Block X3L. Drawings 1H shows a front view of a tube-steel sub-assembly designated Female Building Block X3 mated to a tube-steel sub-assembly designated Male Building Block Y1 in a pivotable configuration. Drawing 1I shows a front view of Female Building Block X3 and Male Building Block Y1 mated in a fixed configuration.

FIG. 3A shows an isometric front view of a Male Building Block and a Female Building Block connected in a pivoting arrangement. FIG. 3B shows an isometric front view of a Male Building Block and a Female Building Block connected in a fixed, linear arrangement. FIG. 3C shows an isometric front view of a Male Building Block and a Female Building Block connected in a fixed, orthogonal arrangement. FIG. 3D is a Lumber Adaptor Connection. FIGS. 3E-3F show front views of tube steel female Extenders.

FIG. 11A is a top view of a Ramp Accessory. FIG. 11B is a side view of a Ramp Accessory.

FIG. 14A is a top view of a Cargo Carrier Accessory. FIG. 14B is a side view of a plywood insert. FIG. 14C is a side view of a drop-in tray. FIG. 14D is a front view of a Cargo Carrier Accessory. FIG. 14E is a side view of a caster wheel, compatible with the Cargo Carrier Accessory. FIG. 14F is a top view of a wagon handle. FIG. 14G is a side view of a wagon handle.

FIG. 15A is a side view of a Lift/Dolly Accessory. FIG. 15B is a front view of a Lift/Dolly Accessory. FIG. 15C is a top view of a cargo carrier fence. FIG. 15D is a side view of the fence.

FIG. 20A-20I are side views of various constructs made with Building Blocks, Connectors, Extenders, and Accessories.

DETAILED DESCRIPTION OF THE PREFERRED EMBODIMENTS

Figure 2A:
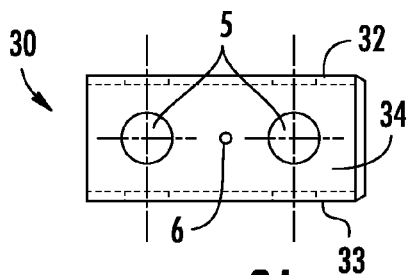
FIGS. 2A and 2B show front views of tube-steel sub-assemblies designated Male Building Block Y1 and Male Building Block Y1L, respectively.

The following descriptions are not meant to limit the invention, but rather to illustrate its general principles of operation. Examples are illustrated with the accompanying drawings. A variety of drawings are offered, showing the present invention in several embodiments, including a plurality of optional accessories.

The present invention is a modular utility system, adaptable to a standard trailer hitch, that allows the user to create a variety of useful applications. The present invention has a set of Male Building Blocks and Female Building Blocks. The Building Blocks can be fashioned into Connectors. Connectors are various useful modules that make pivot points, parallel connections, orthogonal connections in two dimensions, orthogonal connections in three dimensions, and extensions. The Connectors can be Male Building Blocks temporarily connected to Female Building Blocks, or they can be permanent modules fabricated by permanently bonding Male Building Blocks to Female Building Blocks, using means such as welding. The present invention has Lumber Adapters that can be sized, on one end, to mate with either a Male Building Block or a Female Building Block, and is sized at the other end to fit at least one cross-sectional dimension of standard lumber (e.g., 2×2, 2×4, 2×6, etc.). The present invention has Hitch Anchor Shafts, which fit into standard hitch receivers, or into Female Building Blocks, and are provided to extend members away from the hitch. Members can be temporarily constructed from one or more of the Female Building Blocks, the Male Building Blocks, the Connectors, the Lumber Adapters, and the Hitch Anchor Shafts. The members can include, or be combined with, lumber, using the Lumber Adapters. Collectively, the Female Building Blocks, the Male Building Blocks, the Connectors, the Lumber Adapters, and the Hitch Anchor Shafts are referred to as components. talk about car being anchor The components are durably constructed out of materials such as steel, aluminum, polycarbonate, polypropylene, or high-density polyethylene ("HDPE"). To be most widely applicable to standard hitch systems, the mating portion of the components would have a square cross-sectional profile. The components can have through holes, sized to fit standard hitch pins. The through holes can be positioned on the components, so that in some mating configurations, the hitch pins hold parts fixed or rigid with respect to one another, and in other mating configurations, the hitch pins allow the parts to pivot with respect to one another.

FIG. 1A shows a front view of Female Building Block X1 1. In this exemplary embodiment, Female Building Block X1 1 is fabricated from 2½" square tube steel. Female Building Block X1 1 has a top surface 2, and a bottom surface 3. Female Building Block X1 1 has an opening 7 on each side defined by a side edge 4, and the top 2 and bottom 3 surfaces. There are connector holes 5 in the top surface 2 and the bottom surface 3. There are also drain holes 6. FIG. 1B is an end view of Female Building Block X1 1. The connector holes 5 and drain holes 6 are visible, as are the top 2 and bottom 3 surfaces. FIG. 1C is a top view of Female Building Block X1 1. The top surface 2, connector holes 5, and drain holes 6 are visible.

FIG. 1D is a front view of Female Building Block X2 10. Female Building Block X2 has a top surface 12, a bottom surface 13, two side surface (only one visible) 14, and a plurality of connector holes 5 and drain holes 6. FIG. 1E is a front view of Female Building Block X3 15. Female Building Block X3 has a top surface 16, a bottom surface 17, two side surface (only one visible) 18, and a plurality of connector holes 5 and drain holes 6. Female Building Block X3 also has an opening 7. FIG. 1F is a front view of Female Building Block X4 20. Female Building Block X4 has a top surface 22, a bottom surface 23, two side surfaces (only one visible) 21, and a plurality of connector holes 5 and drain holes 6. FIG. 1G is a front view of Female Building Block X3L 25. Female Building Block X3L has a top surface 26, a bottom surface 27, two side surfaces (only one visible) 28, and a plurality of connector holes 5 and drain holes 6. Female Building Block X3L 25 is a longer version of Female Building Block X3 15, showing that the length of any Building Block can be extended or truncated for convenience and utility.

FIG. 2A shows a Male Building Block Y1 30. In this exemplary embodiment, Male Building Block Y1 30 is fabricated from 2" square tube steel, meaning that it can nest inside of the Female Building Blocks 1, 10, 15, 20, 25. Male Building Block Y1 30 has a top surface 32, a bottom surface 33, and two sides (only one visible) 34. Male Building Block Y1 30 has a plurality of connection holes 5 and drain holes 6. Only those holes 5, 6, on the front side 34 are visible in FIG. 2A, although the other side (not visible) 34, and top 32 and bottom 33 surfaces likewise have a plurality of connector holes 5 and drain holes 6.

Figure 2B:
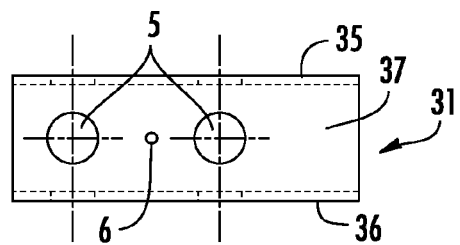

FIG. 2B is Male Building Block Y1L 31. Male Building Block Y1L has a top surface 35, a bottom surface 36, two sides surfaces (only one visible) 37, and a plurality of connection holes 5 and drain holes 6. Only those holes 5, 6, on the front side 37 are visible in FIG. 2B. Male Building Block Y1L 31 is a longer version of Male Building Block X3 30, showing that the length of any Building Block can be extended or truncated for convenience and utility.

Figure 27:
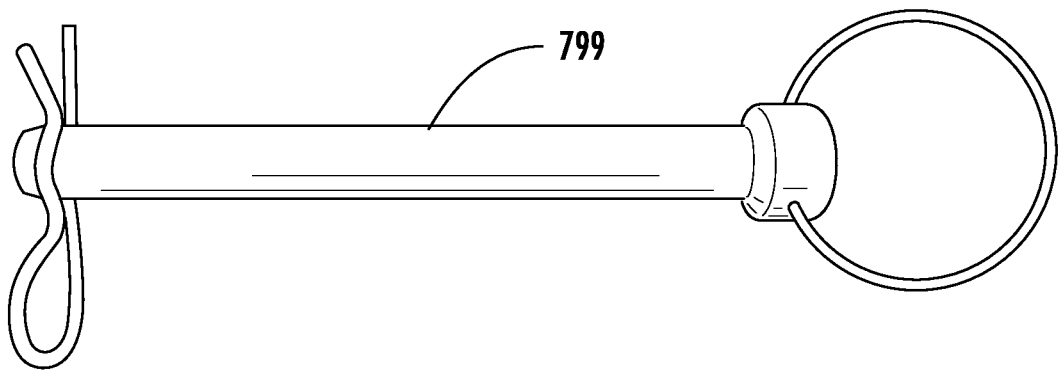
FIG. 27 shows a side view of a standard hitch pin.
Figure 28:
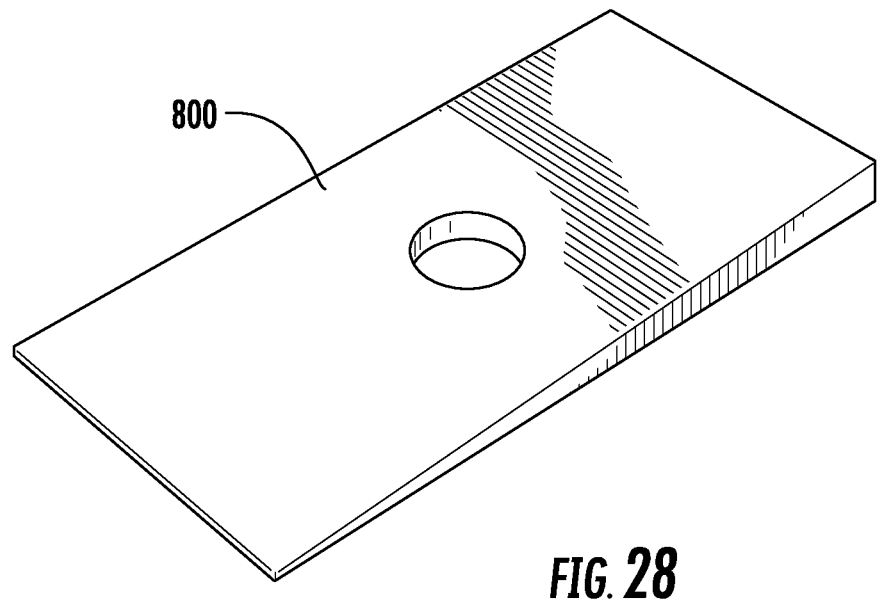
FIG. 28 shows and isometric view of a wedge-shaped shim.

FIG. 27 shows a hitch pin 799. FIG. 28 shows a shim 800. FIG. 1H shows Female Building Block X3 15 connected to Male Building Block Y1 30, in a pivotable configuration. The connection can be made using a hitch pin 799 through the appropriate holes 5. FIG. 1I shows Female Building Block X3 15 connected to Male Building Block Y1 30, in a fixed configuration. The connection can be made using a hitch pin 799. If the fixed configuration is wobbly, or can vibrate too easily, the Building Blocks 15, 30, can be stabilized using a shim 800.

The Female Building Blocks 1, 10, 15, 20, 25 are made with a larger cross-section than the Male Building Blocks 30, 31. In this exemplary embodiment, the Female Building Blocks 1, 10, 15, 20, 25 are made with 2½" tube-steel, while the Male Building Blocks 30, 31 are made with 2" tube-steel.

Figure 2C:
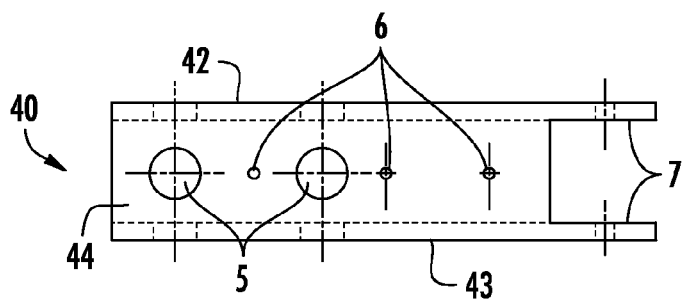
FIG. 2C shows a front view of a lumber adapter designated Adapter L1.

The Building Blocks 1, 10, 15, 20, 25, 30, 31 can be combined with other Building Blocks 1, 10, 15, 20, 25, 30, 31 or with Lumber Adapters. FIG. 2C shows Lumber Adapter L1 40. Lumber Adapter L1 40 has a top surface 42, a bottom surface 43, and two side surfaces (only one visible) 44. In this exemplary embodiment, Lumber Adapter L1 40 is fabricated from 2" tube-steel, like the Male Building Blocks 30, 31; however, for convenience and utility, it 40 can also be fabricated from 2½" tube-steel, like the Female Building Blocks 1, 10, 15, 20, 25. Lumber Adapter L1 40 has connector holes 5 and drain holes 6. The connector holes 5 allow the Lumber Adapter L1 40 to be fastened to Female Building Blocks 1, 10, 15, 20, 25. The drain holes 6 can be left to act merely as drain holes, or they can be used for nailing or pinning lumber. Lumber Adapter L1 40 has an opening 7 that, in this exemplary embodiment, is sized to take one cross-sectional dimension of a standard 2"×4".

Figures 19A, 19B, 19C:
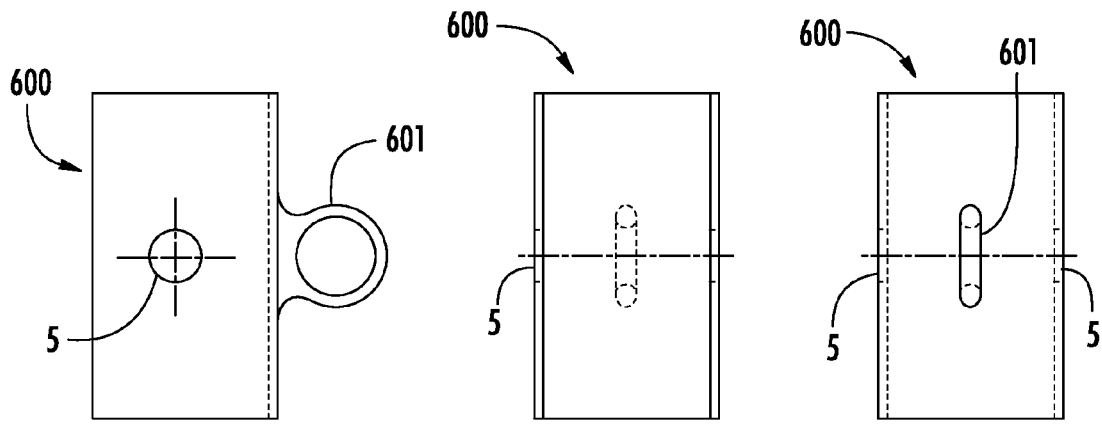
FIG. 19A is a side view of a ring adapter.
FIG. 19B is a rear view of a ring adapter.
FIG. 19C is a front view of a ring adapter.
Figures 19D, 19E:
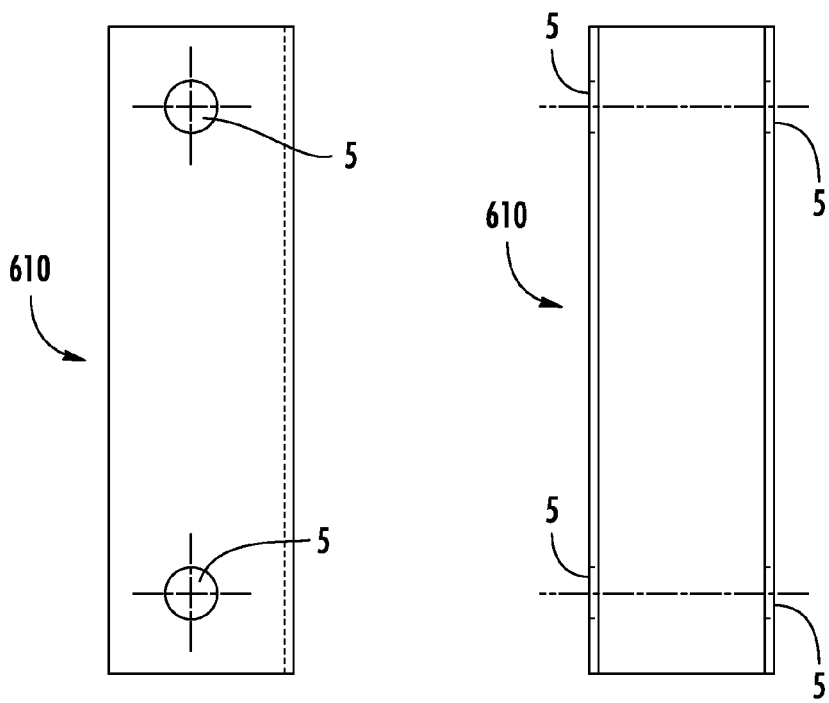
FIG. 19D is a side view of an Open Channel Building Block.
FIG. 19E is a front view of an Open Channel Building Block.
Figure 19F:
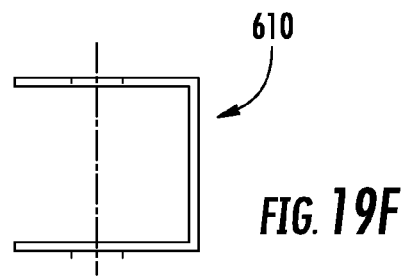
FIG. 19F is a top view of an Open Channel Building Block.

FIG. 19A-19F illustrates an alternative Building Block 600, 610 concept. Instead of a Female Building Block 1, 10, 15, 20, 25 made of closed tube steel, an open channel 600, 610 could be used to fit over the Male Building Blocks 30, 31. FIG. 19A shows a side view of an Open Channel Build Block 600, with a ring 601; FIG. 19B shows a rear view of an Open Channel Build Block 600, with a ring 601; FIG. 19C shows a front view of an Open Channel Build Block 600, with a ring 601. FIG. 19D shows a side view of an Open Channel Building Block 610; FIG. 19E shows a rear view of an Open Channel Building Block 610; FIG. 19F shows a top view of an Open Channel Building Block 610. The Open Channel Building Blocks 600, 610 would have a plurality of connector holes 5.

Figure 2D:
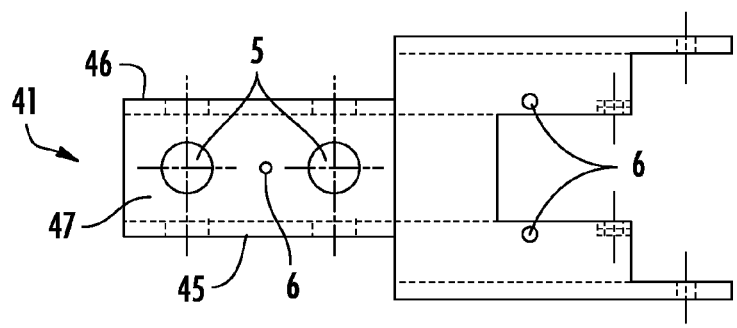
FIG. 2D shows a front view of a lumber adapter designated Adapter L2.

FIG. 2D shows Lumber Adapter L2 41. Lumber Adapter L2 41 has a top surface 46, a bottom surface 45, and two side surfaces (only one visible) 47. In this exemplary embodiment, Lumber Adapter L2 41 is fabricated from 2" tube-steel, like the Male Building Blocks 30, 31; however, for convenience and utility, it 41 can also be fabricated from 2½" tube-steel, like the Female Building Blocks 1, 10, 15, 20, 25. Lumber Adapter L2 41 has connector holes 5 and drain holes 6. The connector holes 5 allow the Lumber Adapter L2 41 to be fastened to Female Building Blocks 1, 10, 15, 20, 25. The drain holes 6 can be left to act merely as drain holes, or they can be used for nailing or pinning lumber. Lumber Adapter L2 41 is dimensioned to take either cross-sectional dimensions of a standard 2"×4".

Figure 2E:
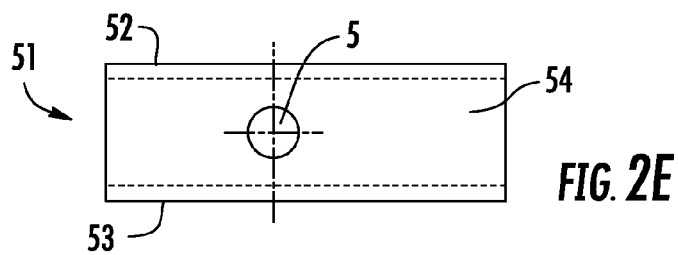
FIGS. 2E and 2F show front views of hitch anchor shafts fasteners designated Hitch Anchor Shaft Z1 and Hitch Anchor Shaft Z2, respectively.
Figure 2F:
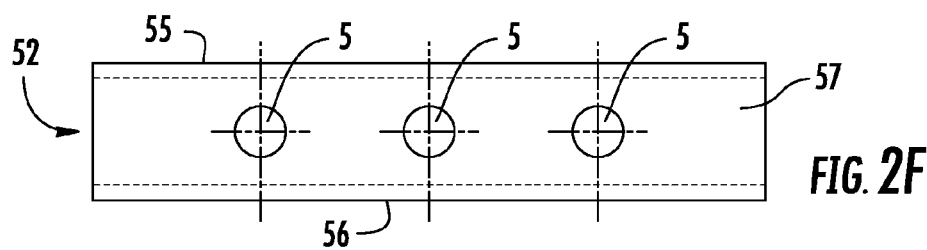

FIGS. 2E and 2F show hitch anchor shafts 51, 52. Both anchor shafts 51, 52 are sized to be inserted in Female Building Blocks 1, 10, 15, 20, 25, or other similarly sized openings. Both anchor shafts 51, 52 have a plurality of connector holes 5. Anchor shaft 51 has a front face 54, and sides 53. The rear is not visible. Anchor shaft 52 has a front face 57, two sides 56, 57, and is longer than the other anchor shaft 51.

FIG. 3A shows Female Building Block X3L 25 connected to Male Building Block Y1L 31. In this configuration, Male Building Block Y1L 31 can pivot about an axis made with a hitch pin 799 placed through connector holes 5 in both the Male Building Block Y1L 31 and the Female Building Block X3L 25. FIG. 3B shows Female Building Block X3L 25 connected to Male Building Block Y1L 31. In this configuration, Male Building Block Y1L 31 cannot pivot about an axis made with a hitch pin 799 placed through connector holes 5 in both the Male Building Block Y1L 31 and the Female Building Block X3L 25. It 31 is held fixed. Connector holes 5 can be arranged on the surfaces of the Female Building Blocks 1, 10, 15, 20, 25 and the Male Building Blocks 30, 31, so that some configurations allow for the parts to pivot, and other configurations fix the parts in place.

FIG. 3C shows a generic Male Building Block 52 connected to Female Building Block X3L 25 in an orthogonal fixed configuration. This is an "L" orthogonal arrangement. By using a longer generic Male Building Block 52 it would be possible to make a "T" orthogonal arrangement.

FIG. 3E-3F shows two Extenders. FIG. 3D shows Extender E8 60. Extender E8 60 has a top surface 61, a bottom surface 63, and two side surfaces (only one visible) 62. Extender E8 60 has connector holes 5 and drain holes 6. FIG. 3E shows Extender E12 65. Extender E12 65 has a top surface 66, a bottom surface 67, and two side surfaces (only one visible) 68. Extender E8 65 has connector holes 5 and drain holes 6. FIG. 3F shows Extender E18 70. Extender E18 70 has a top surface 71, a bottom surface 72, and two side surfaces (only one visible) 73. Extender E18 70 has connector holes 5 and drain holes 6. In this exemplary embodiment, the Extenders 60, 65, 70 are fabricated from 2" tube-steel, like the Male Building Blocks 30, 31; however, for convenience and utility, the Extenders 60, 65, 70 can also be fabricated from 2½" tube-steel, like the Female Building Blocks 1, 10, 15, 20, 25.

Figure 5A:
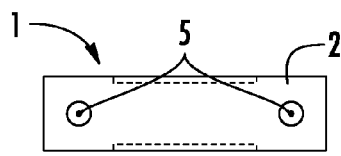
FIGS. 5A through 5N are top views of a series of Connectors constructed from the Male Building Blocks and the Female Building Blocks.
Figure 5B:
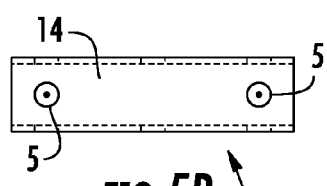
FIG. 5P is a side view of a support.
FIG. 5O is a top view of a support.

FIGS. 5A-5N show a variety of potential Connectors for this exemplary embodiment. FIG. 5A and FIG. 5B are a repeat of FIG. 1A and FIG. 1D, respectively. FIG. 5A shows Female Building Block X1 1. FIG. 5B shows Female Building Block X2. Female Building Blocks X1 1 and X2 10 are the two simplest Connectors. Female Building Block X1 1 is a double pivot connector, and, for connection purposes, will be referred to as Connector C1 1. Female Building Block X2 10 is a double rigid connector, and, for connection purposes, will be referred to as Connector C2 10.

Figure 5C:
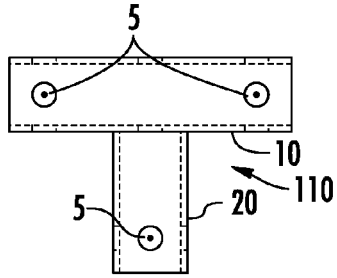
Figure 5D:
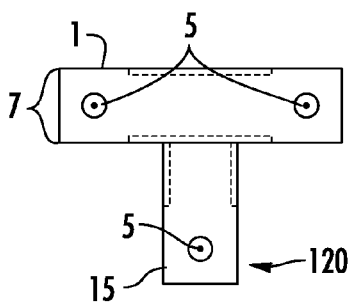
Figure 5E:
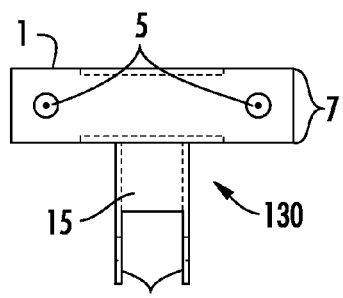

FIG. 5C shows Connector C3 110, comprised of Female Building Blocks X2 10 and X4 20. Connector C3 110 is a rigid "T". The Female Building Blocks 10, 20 of Connector C3 110 are durably connected, using a means such as welding. FIG. 5D shows Connector C4 120, comprised of Female Building Blocks X1 1 and X3 15. Each end of Connector C4 120 is open 7. Connector C4 120 is a triple pivot "T". The Female Building Blocks 1, 15 of Connector C4 120 are durably connected, using a means such as welding. FIG. 5E shows Connector C5 130, comprised of Female Building Blocks X1 1 and X3 15. Each end of Connector C5 130 is open 7. Connector C5 130 is a triple pivot cross "T". In Connector C5 130, the Female Building Block X3 15 is rotated 90° with respect to Connector C4 120. The Female Building Blocks 1, 15 of Connector C5 130 are durably connected, using a means such as welding.

Figure 5F:
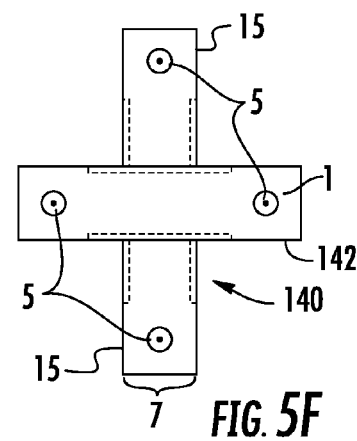

FIG. 5F shows Connector C6 140, comprised of Female Building Block X1 1 and two orthogonally connected Female Building Blocks X3 15. Each of the four ends of Connector C6 140 is open 7. Connector C6 140 is a quad pivot cross coupler. The Female Building Blocks 1, 15 of Connector C6 140 are durably connected, using a means such as welding. FIG. 5G shows Connector C7 146, comprised of two Female Building Block X3 15. Connector C 146 is a double pivot "L". The Female Building Blocks 1 of Connector C7 146 are durably connected, using a means such as welding.

FIG. 5H shows Connector C8 151, comprised of two Female Building Blocks X4 20. Connector C8 151 is a double rigid "L". The Female Building Blocks X4 20 of Connector C8 151 are durably connected, using a means such as welding. FIG. 5N shows Connector C12 180, comprised of two Female Building Blocks X2 10. Connector C12 180 is another example, like Connector C8 151, of a double rigid "L". The Female Building Blocks X2 10 of Connector C12 180 are durably connected, using a means such as welding.

FIG. 5I shows Connector C9 155, comprised of Female Building Block X1 1 and Male Building Block Y1 30. The two ends of Female Building Block X1 1 are open 7. Connector C9 155 is a double pivot "T" with an orthogonal Male Building Block Y1 30. The Female Building Block X1 1 and Male Building Block Y1 30 are durably connected, using a means such as welding. FIG. 5K shows Connector C11 165, comprised of a generic, extra-long Male Building Block 65 and Male Building Block Y1 30. Connector C11 is a triple-male "T". The Male Building Block 65 and Male Building Block Y1 30 are durably connected, using a means such as welding. FIG. 5N shows Connector C12 180, comprised of two Female Building Blocks X2 10. Connector C12 180 is another example, like Connector C8 151, of a double rigid "L".

FIG. 5L shows a Female Building Block 3XL 25 mated to a Male Building Block Y1L 31, illustrating how to change the connector ends from Male-to-Female or from Female-to-Male. Female Building Block 3XL 25 can be durably bonded to a Male Building Block Y1L 31, using a means such as welding; Female Building Block 3XL 25 can be temporarily connected to Male Building Block Y1L 31, using a temporary means such as a hitch pin 799 and shim 800.

FIGS. 5J and 5M show Connectors C10 160 and C13 175, respectively. Connector C10 160 is comprised of three Female Building Blocks X4 20. Connector C10 160 is a triple female corner. The Female Building Blocks 160 are durably connected, using a means such as welding. Connector C13 175 is comprised of two Male Building Blocks Y1 30 and one Male Building Block Y1L 31. Connector C13 175 is a triple male corner. The two Male Building Blocks Y1 30 and one Male Building Block Y1L 31 are durably connected, using a means such as welding. All Connectors C1-C13 1, 5, 110, 120, 130, 140, 146, 151, 155, 160, 165, 175, 180, have a plurality of connector holes 5.

FIG. 5O shows a top view of a Firm Foot Connector 192; FIG. 5P shows a front side view of a Firm Foot Connector 192. The Firm Foot Connector 192 has a base portion 191 durably connected to a Female Building Block X3 15, using a means such as welding. The Firm Foot Connector 192 has a plurality of connector holes 5 and has an open 7 end.

Figure 4:
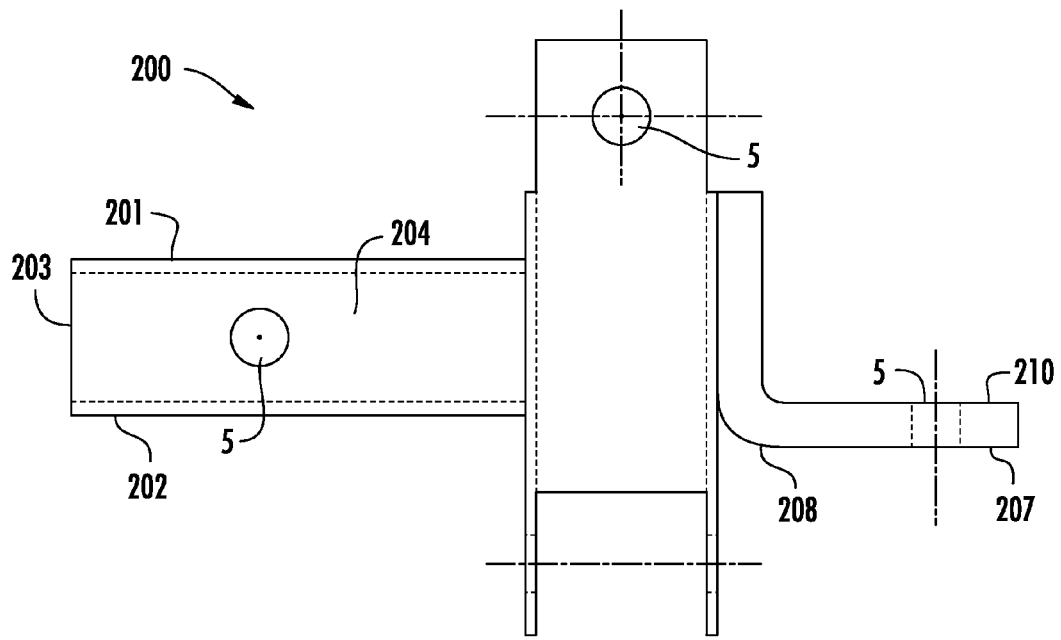
FIG. 4 shows a side view of a hitch anchor mount with dual pivots.
Figure 6A:
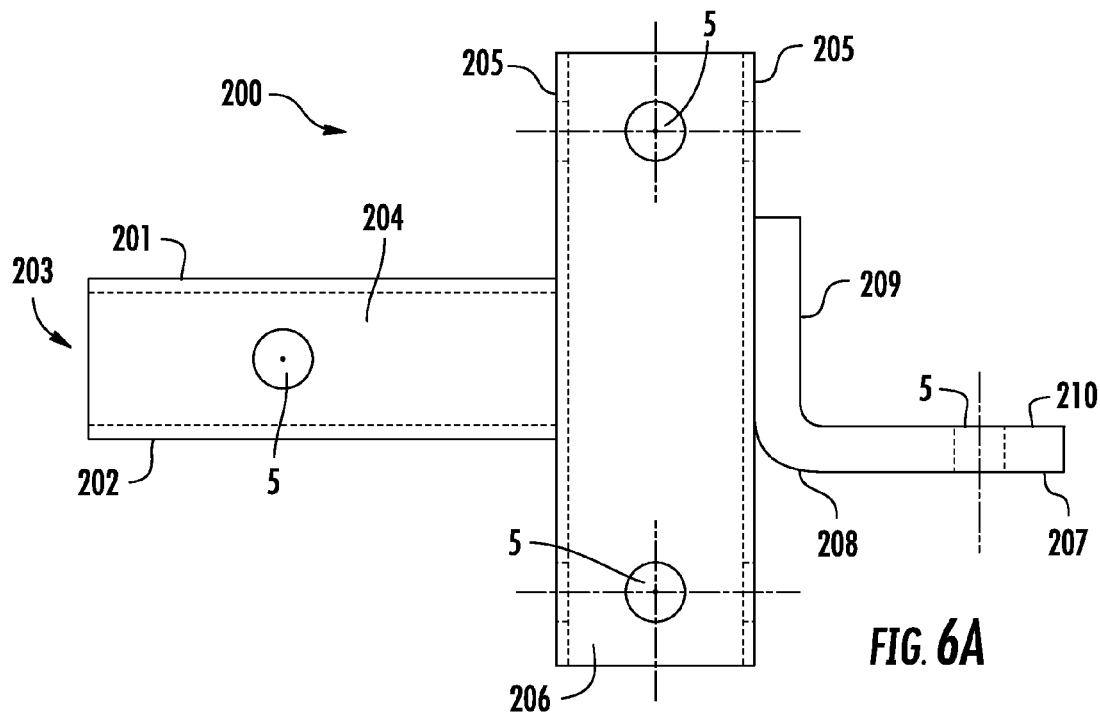
FIG. 6A shows a side view of a hitch.

FIGS. 4, 6A, 6B, and 7 show a variety of hitches that would be compatible with the Connectors 1, 5, 110, 120, 130, 140, 146, 151, 155, 160, 165, 175, 180 and Building Blocks 1, 10, 15, 20, 25, 30, 31. FIGS. 4 and 6A show a hitch 200 comprised of a receiver mating shaft 203, a vertical shaft, and a hitch portion 207. The receiver mating shaft 203 has a top surface 201, a bottom surface 202, and two side surfaces (only one visible) 204. The receiver mating shaft 203 is durably bonded to the vertical shaft, using a means such as welding. The vertical shaft is generic, as it represents any of the Building Blocks 1, 10, 15, 20, 25, 30, 31. The vertical shaft will have two side surfaces 205, a front surface 206, and a rear surface (not shown). The hitch portion 207 has a top surface 210 and bottom surface 208, and a shank 209 connected to the vertical shaft side surface 205. The hitch portion 207 is durably bonded to the vertical shaft, using a means such as welding. The hitch 200 has a plurality of connector holes 5.

Figure 6B:
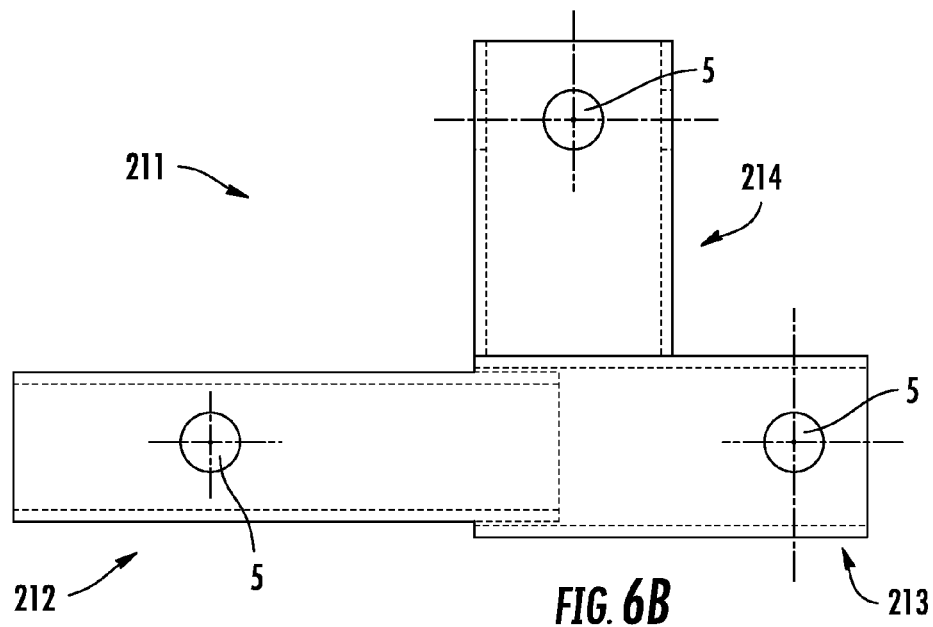
FIG. 6B shows a side view of a receiver adapter hitch connector.

FIG. 6B shows a hitch 211 comprised of a receiver mating shaft 212, a vertical shaft 214, and a receiver 213. The hitch 211 is used to make a standard hitch receiver (not shown) and standard hitch (not shown) compatible with the present invention. The vertical shaft 214 is compatible with Male Building Blocks 30, 31. The vertical shaft 214 could also be made compatible with Female Building Blocks 1, 10, 15, 20, 25. The hitch portion 207 has a top surface 210 and bottom surface 208. The hitch 200 has a plurality of connector holes 5.

Figure 7:
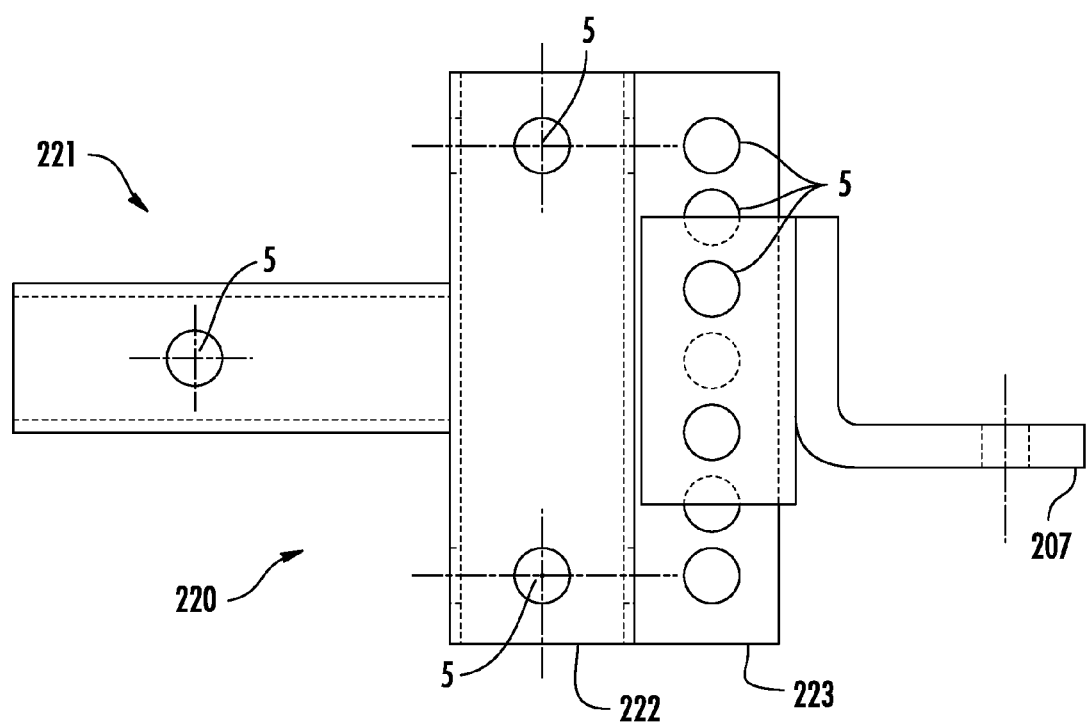
FIG. 7 shows a side view of an alternative embodiment trailer hitch.

FIG. 7 shows an alternative embodiment hitch 220, comprised of a receiver mating shaft 221, two vertical shafts 222, 223, and a hitch portion 207. One vertical shaft 222 is compatible with Male Building Blocks 30, 31, and the other vertical shaft 223 is compatible with Female Building Blocks 1, 10, 15, 20, 25. The two vertical shafts 222, 223 can be temporarily or permanently offset, to allow differing mounting possibilities. All of the hitches 220, 221, 200 have a plurality of connector holes 5.

Figure 8A:
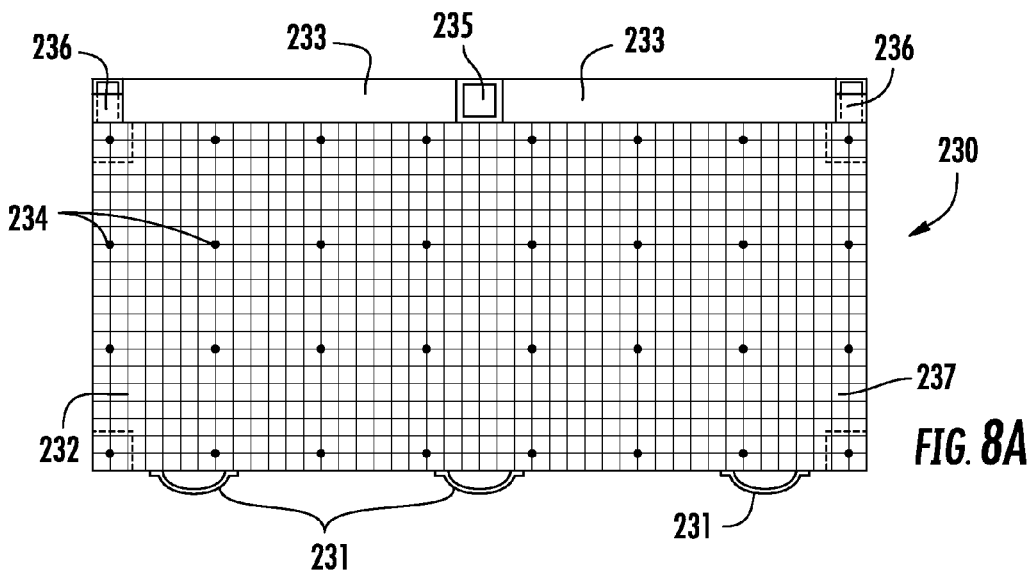
FIG. 8A shows a top view of a Workbench Accessory.
Figure 8B:
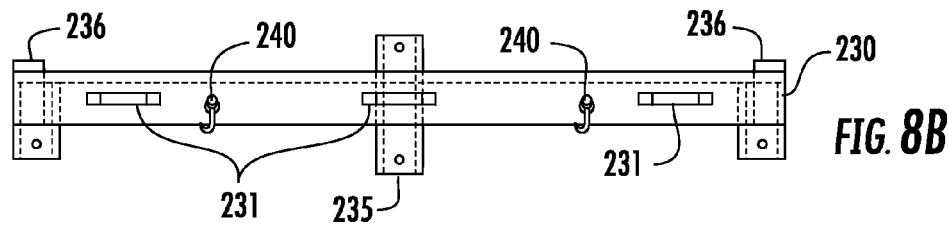
FIG. 8B shows a front side view of the Workbench Accessory.
Figure 8C:
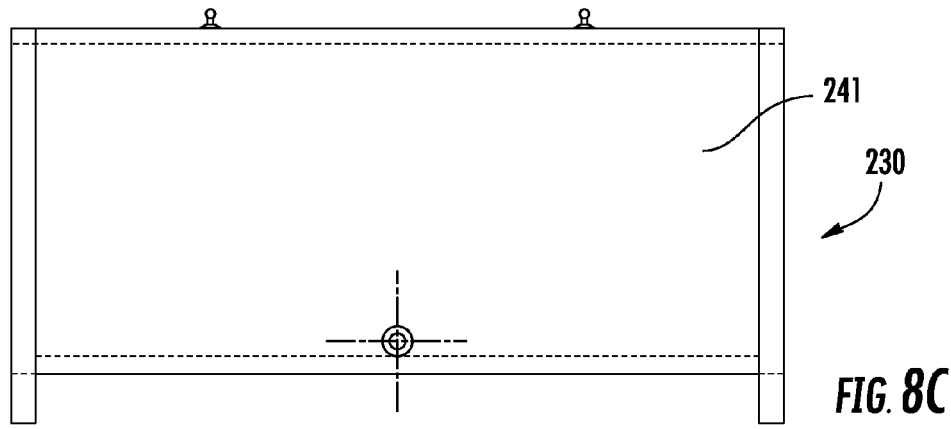
FIG. 8C shows the bottom view of the Workbench Accessory.
Figure 8D:
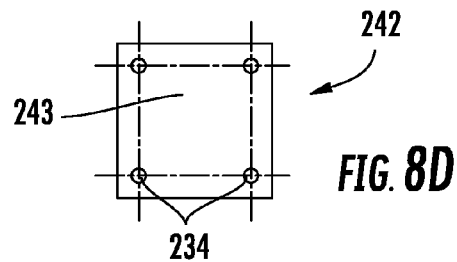
FIG. 8D shows a top view of a tool mounting plate.

A variety of mountable Accessories can add to the utility of the present invention. FIGS. 8A-8C show Accessory A1 230, a work bench. FIG. 8A shows the top of Accessory A1 230, FIG. 8B shows the front of Accessory A1 230, and FIG. 8C shows the bottom of Accessory A1 230. The work platform 232 of Accessory A1 230 can be fabricate from plywood or other suitable material. Through holes 234 can be drilled in the work platform 232. The work platform 232 can also be scribed with grids 237. Accessory A1 230 has handles 231 for carrying, and can have hooks 240. Accessory A1 230 comes with a plurality of shaft and/or stake protrusions 236, 235 to mate with lumber, Building Blocks 1, 10, 15, 20, 25, 30, 31 and/or Connectors 1, 5, 110, 120, 130, 140, 146, 151, 155, 160, 165, 175, 180. Accessory A1 230 has tool holder trays 233. FIG. 8D shows a tooling plate 242 that can be mated to Accessory A1 230. The plate has a steel base 243 and through holes 234, which can be aligned with those on Accessory A1 230.

Figure 9A:
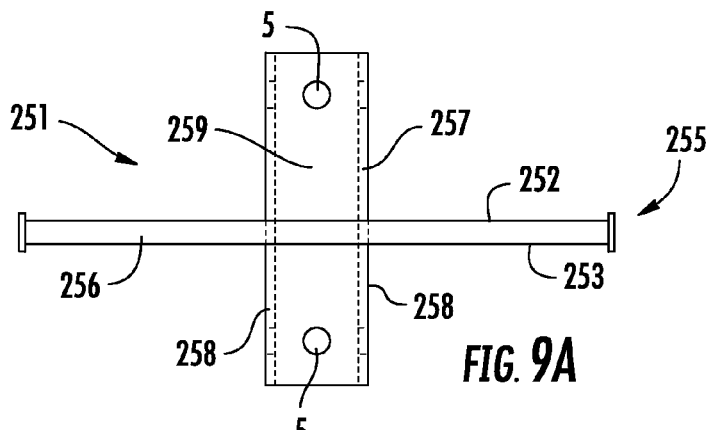
FIG. 9A shows a front side view of Step Accessory.

FIG. 9A shows Accessory A2 251, a ladder step. Accessory A2 251 has a step 255, which has a top surface 252, a bottom surface 253, and an edge 256. The user (not shown) would tread on the top surface 252. Accessory A2 251 has a mounting shaft 257, which has side surfaces 258, a front surface 259, and a back surface (not visible from this view). The mounting shaft 257 is a Female Building Block X2 10. Accessory A2 251 has a plurality of connector holes 5.

Figure 9B:
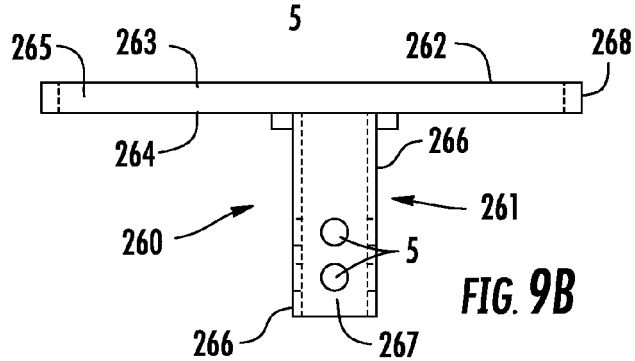
FIG. 9B is a front side view of a Step or Seat Accessory.
Figure 9C:
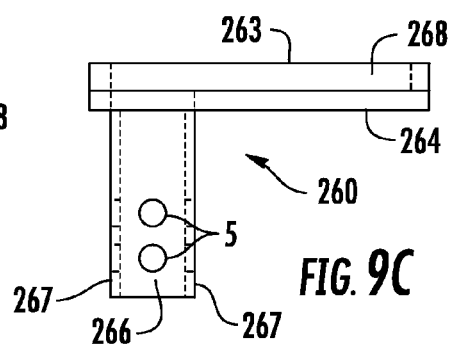
FIG. 9C is a side view of a Step or Seat Accessory.

FIG. 9B shows a front view of Accessory A3 260; FIG. 9C shows a side view of Accessory A3 260. Accessory A3 260 is a seat or step. Accessory A3 260 has a shaft 261 which is Male Building Block Y1L 31. The shaft 261 has two side surfaces 266, and two facing surfaces 267. The platform 262 has a top surface 263, a bottom surface 264, a facing edges 265, and side edges 268.

Figure 9D:
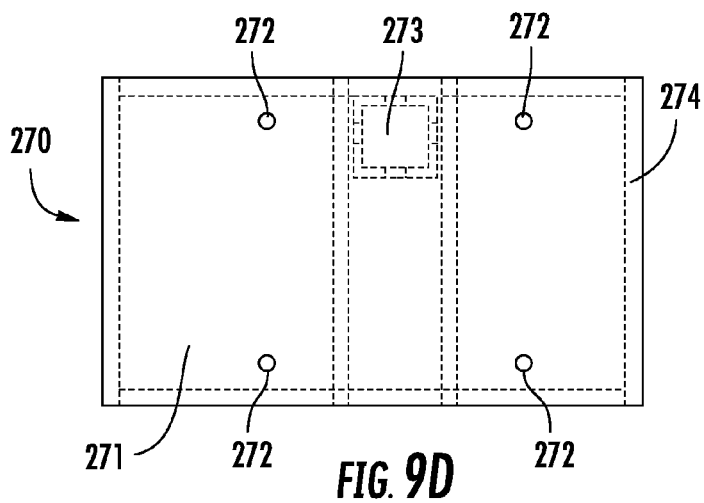
FIG. 9D is a top view of a Non-Skid Surface Plate Accessory.
Figure 9E:
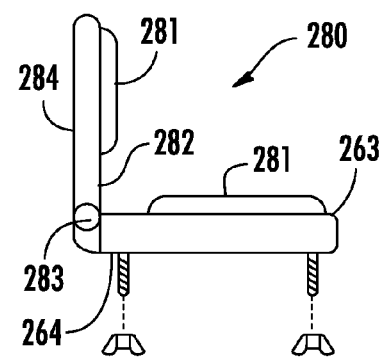
FIG. 9E is a side view of a Seat Accessory.
Figure 9F:
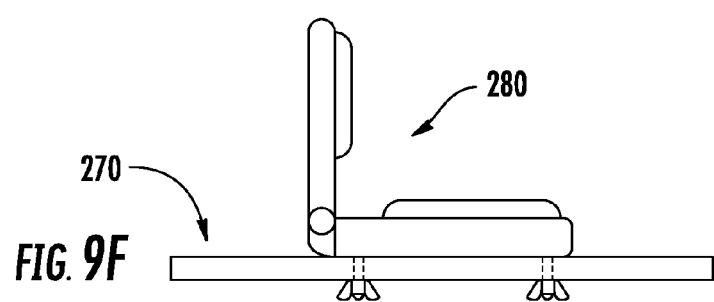
FIG. 9F is a side view of a Seat Accessory mounted to a Non-Skid Surface Plate Accessory.

FIG. 9D shows a mounting plate 270; FIG. 9E shows a seat 280; FIG. 9F shows the seat 280 mounted to the plate 270. The mounting plate 270 is comprised of a surface 271; through holes 272, which can be fitted with welded-in-place nuts; a mounting receiver 273, compatible with Male Building Blocks 30, 31; and, optionally, reinforcing members 274. The Chair 280 is comprised of a back 284, a front 282, a top 263, a bottom 264, a hinge 283, and a plurality of cushions 281. The Chair 280 can be fabricated so that it can be mated with the mounting plate 270, as illustrated in FIG. 9F.

Figure 10A:
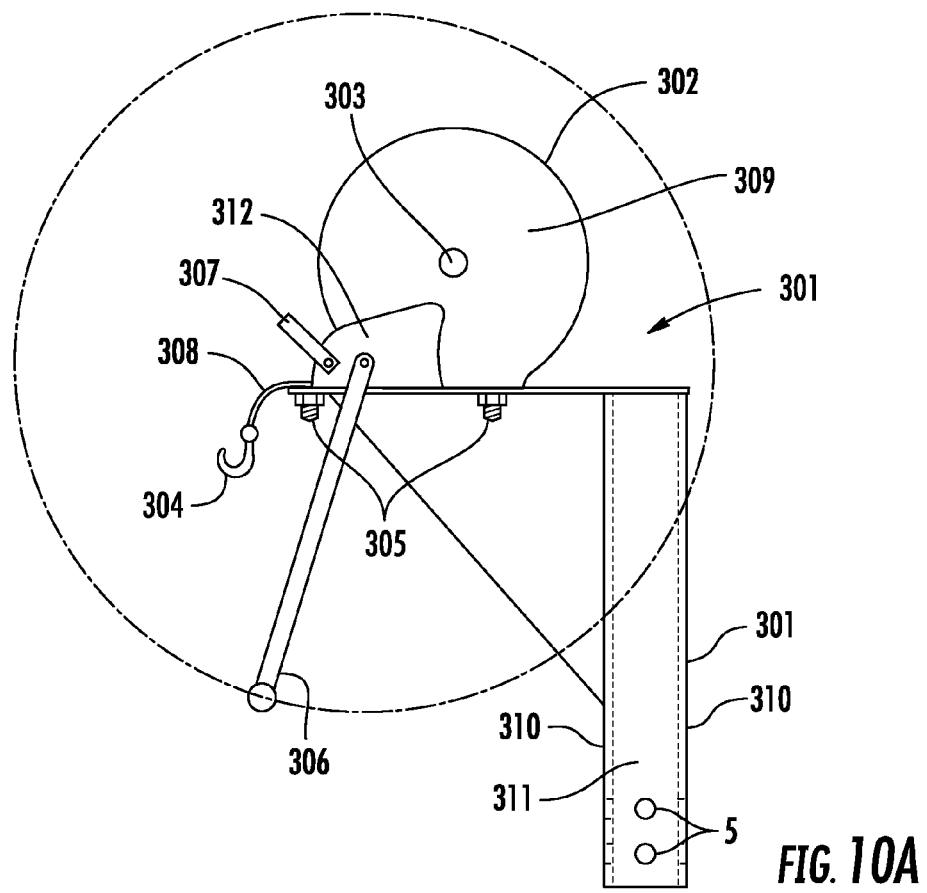
FIG. 10A is a side view of a right angle Mechanical Winch Accessory.
Figure 10B:
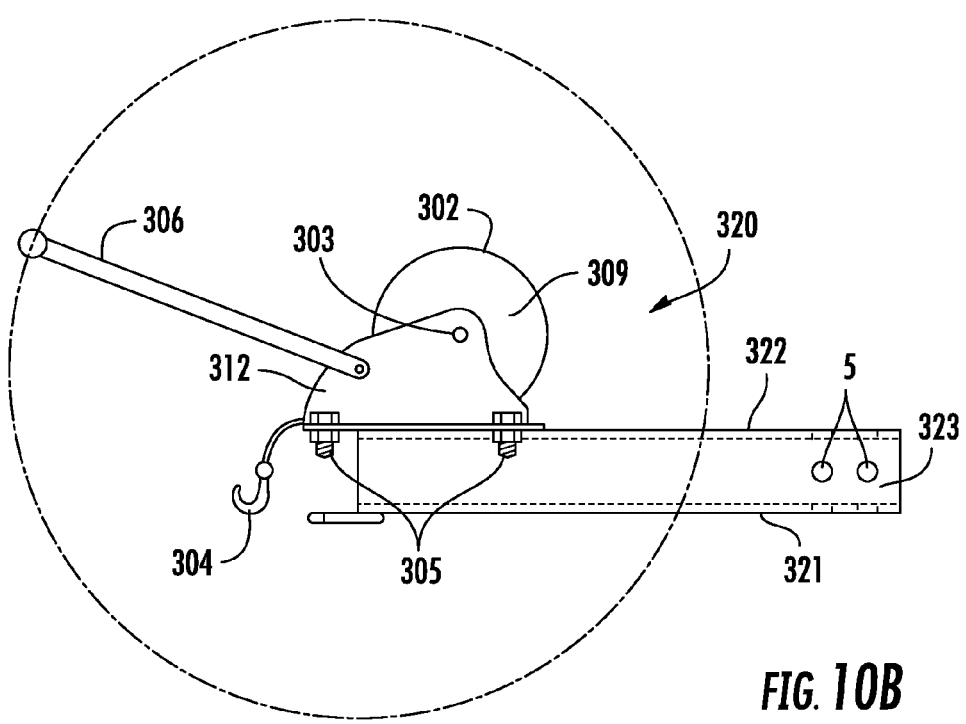
FIG. 10B is a side view of a straight Mechanical Winch Accessory.

FIGS. 10A and 10B show alternative embodiments of a pulley, Accessory A4 301 and Accessory A5 320. In FIG. 10A, the pulley 301 has a mating shaft that has side surfaces 310 and facing surfaces (only one visible) 311. In FIG. 10B, the pulley 320 has a mating shaft with a top surface 322, a bottom surface 321, and side surfaces (only one visible 323). The mating shafts of both pulleys 301, 320 are compatible with Male Building Blocks 30, 31. The pulley assembly 302 has a hook 304, wire 308, a handle 306, an axle for rotation 303, a wire housing 309, a pulley mount 312, and mounting hardware 305. The pulley 301 also has a wire guide 307.

FIGS. 11A and 11B show Accessory A6 340, a ramp that distributes the loading weight to the trailer hitch 200, for use with a pick-up truck (not shown). Accessory A6 340 has two ramp panels 344, 345. Accessory A6 340 has a support member 350 that mates with the hitch 200. Accessory A6 340 has two panels 341, 342 that remain in the bed of the pick-up (not shown). There is also a transition panel 343 for the space between the end of the pick-up and the hitch mate 350. There are two inserts 346, compatible with Female Building Blocks 1, 10, 15, 20, 25.

Figure 12A:
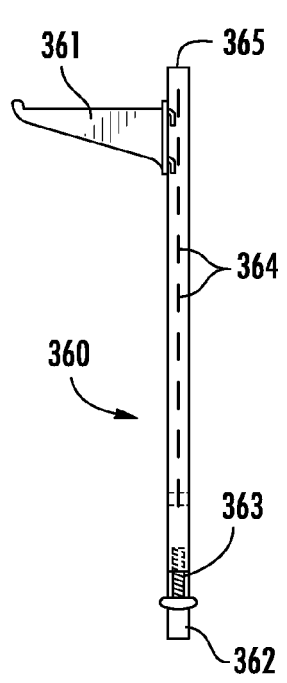
FIG. 12A is a side view of a Rack Accessory.
Figure 12B:
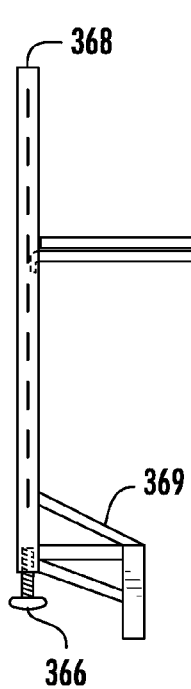
FIG. 12B is a side view of a Rack Accessory.

FIGS. 12A and 12B show a rack, Accessory A7 360. The rack 360 has couplers 362, that mate with a trailer hitch 200, or with Female Building Blocks 1, 10, 15, 20, 25. Additionally, the rack 360 has feet 366, which are adjustable using a screw 363, to level the rack 360, if necessary. The rack 360 has two upright members 368 and two support structures 369, which contain the couplers 362. The upright members 368 have caps 365, which keep debris out of the upright members 368. The rack 360 has a standard shelf 370 which is supported by supports 361 that are inserted into slots 364 in the upright members 368.

Figure 13A:
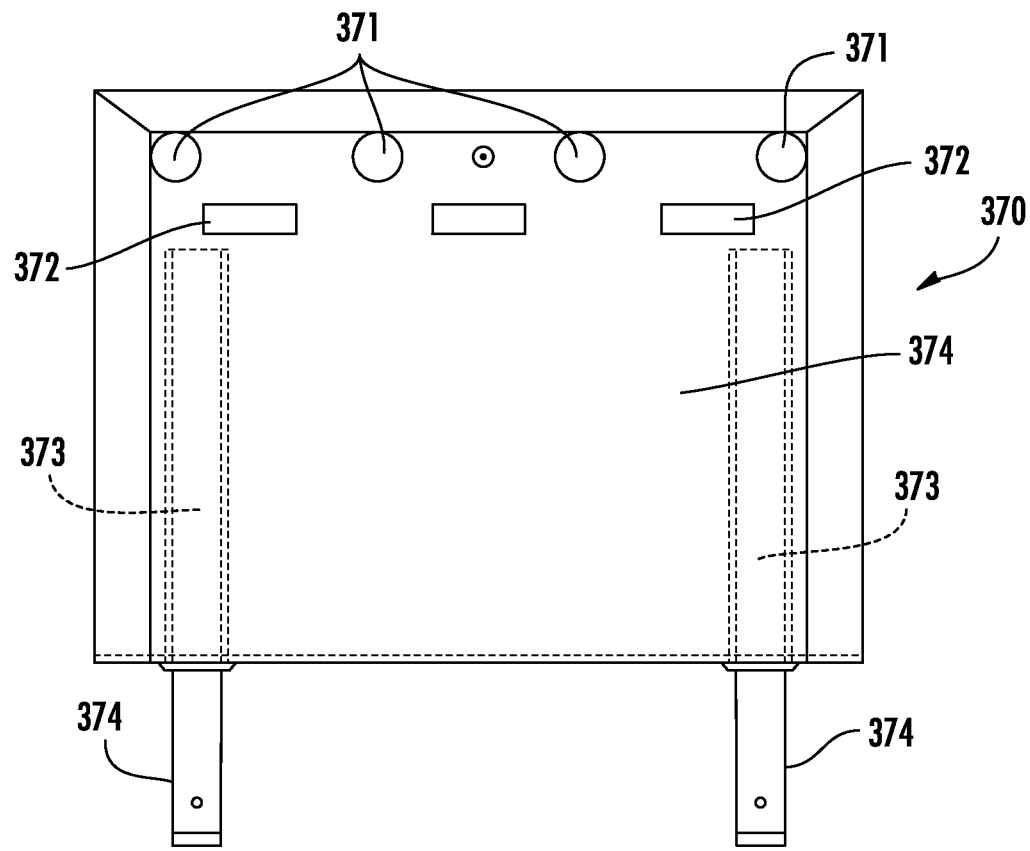
FIG. 13A is a front view of a Barrier Accessory.
Figure 13B:
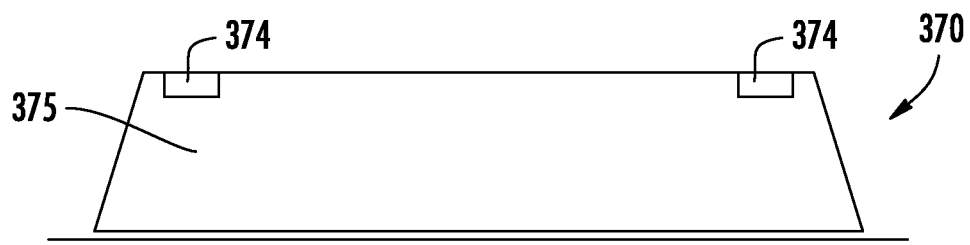
FIG. 13B is a bottom view of a Barrier Accessory.

FIGS. 13A and 13B show Accessory A8 370, a mountable barrier. Accessory A8 370 has two support members 374, which are securely fastened 373 to the barrier 370. The barrier can have lights 371 or holes 372. The barrier 370 can have a non-rectangular cross-section 375. The support members 374 mate with a trailer hitch 200, or with Female Building Blocks 1, 10, 15, 20, 25.

FIGS. 14A-14G show Accessory A9 400, a cargo carrier. The cargo carrier can be pivotably mounted to a hitch 200 using on open-ended coupler 402, 405, 426. Accessory A9 400 has a frame 420 defined by four members 409, 407, 410, and 408, leaving two open areas 404, 406. A support 422 bisects the frame 420 of Accessory A9 400. The frame 420 has a raised side 421. A light-weight, plywood insert 411 or a tray 412 fits in the frame. The frame 420 and frame members 409, 407, 410, 408 have a plurality of connection holes 5, 425. The frame 420 has open supports 401, 403, 424, that mate with Building Blocks 1, 10, 15, 20, 25, 30, 31. The open coupler 426 is hinged, allowing Accessory A9 400 to pivot. Accessory A9 400 has a connector 423 for an optional handle 440. The handle 440 would have a grasping handle 443, a member 442, and a connector 441. The supports 401, 403, 424 could mate with a caster wheel 430, to allow Accessory A9 400 to roll on a loading dock or other flat surface. FIGS. 15C-15D show a cargo carrier 400 fence 470. The fence 470 has a front 472 and two sides 473, 471. The sides 473, 471 fold on a hinge 475. The fence fits into the cargo carrier supports 401, 403 using coupling members 474.

FIGS. 15A and 15B show the side and front of Accessory A10 450, respectively. Accessory A9 400 can be mated with a lift 450, Accessory A10. Accessory A10 450 has wheels 451 and, optionally, wheel housings/load-stabilizing supports 463, 464, to act as a stop and support for the load. Accessory A10 450 male 455, 465 and female fittings 456. Accessory A10 450 has an optional cross support 452. The riser has a side surface 454 and a front surface 462. Accessory A10 450 has handles 461 to raise the load, using a riser mechanism means 457, and a lock 453 to lock it in place.

Figure 16A:
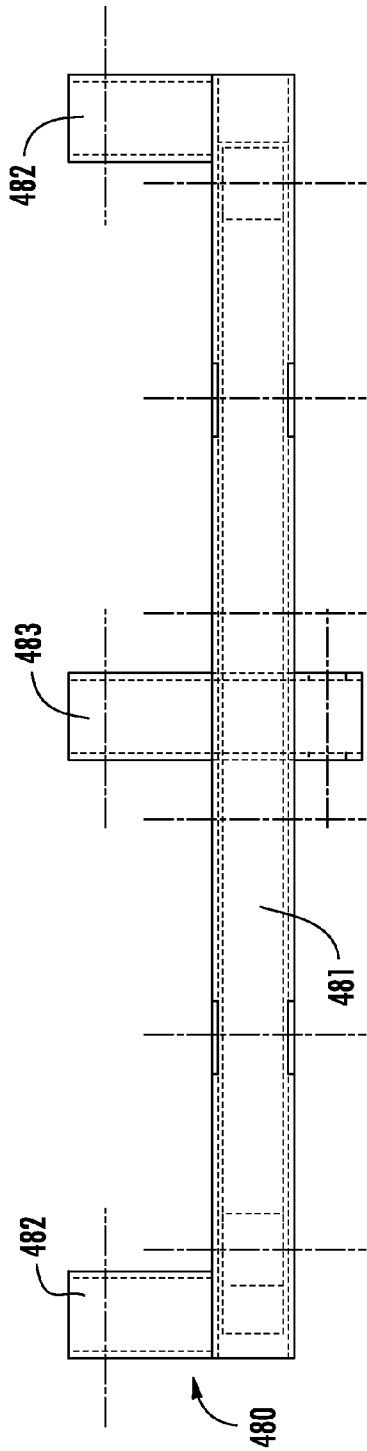
FIG. 16A is a front view of an Axle Assembly Accessory.
Figure 16B:
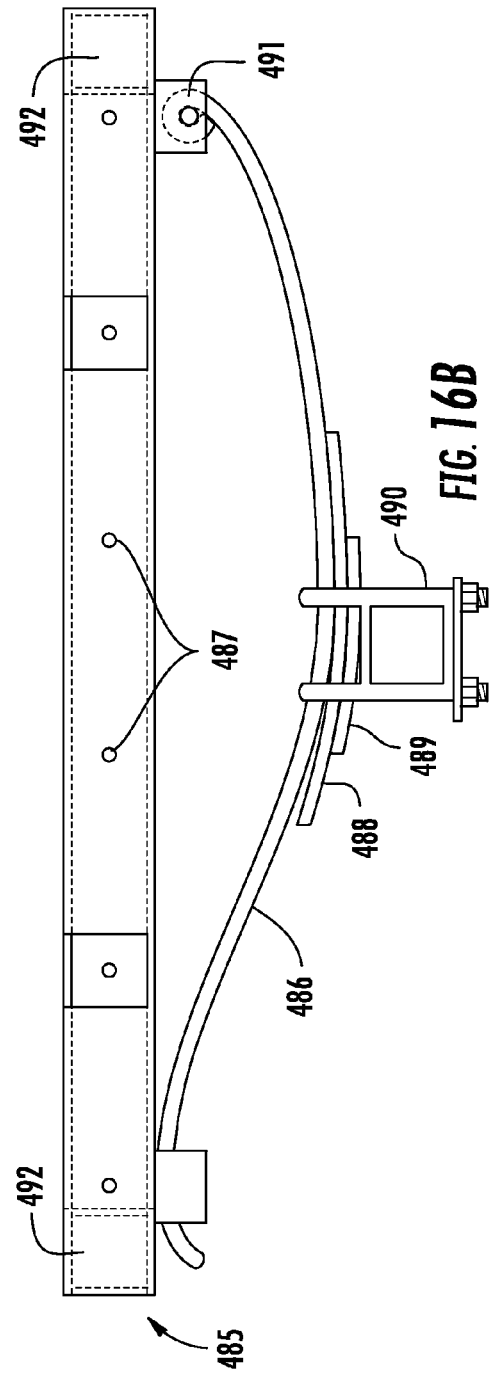
FIG. 16B is a front view Axle Assembly Accessory.

FIGS. 16A and 16B show Accessory A11A 480 and Accessory A11B 485, both axles, respectively. The axle 480 has a transverse member 481, and a plurality of coupling members 482, 483, which mate with Building Blocks 1, 10, 15, 20, 25, 30, 31. The axle 485 has a leaf spring arrangement composed of a plurality of springs 486, 488, 489, connected to a leaf spring retainer 490, and fixed at one end 491. The axle 485 has a plurality of connector holes 487, and two mounting inserts 492.

Figure 17A:
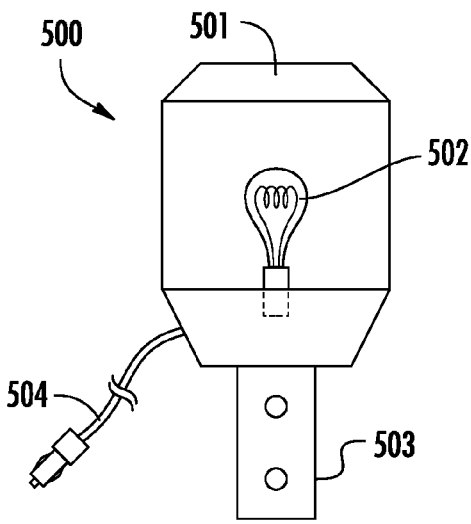
FIG. 17A-17D are front views of a Light Accessories.
Figure 17B:
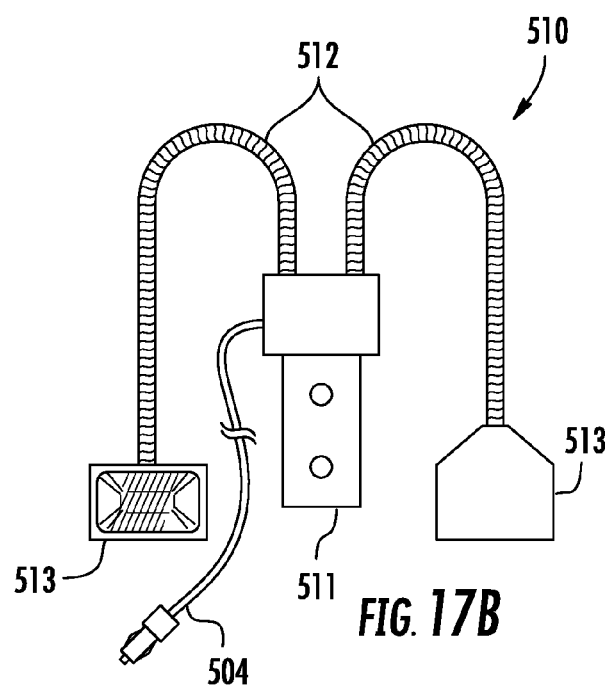
Figure 17C:
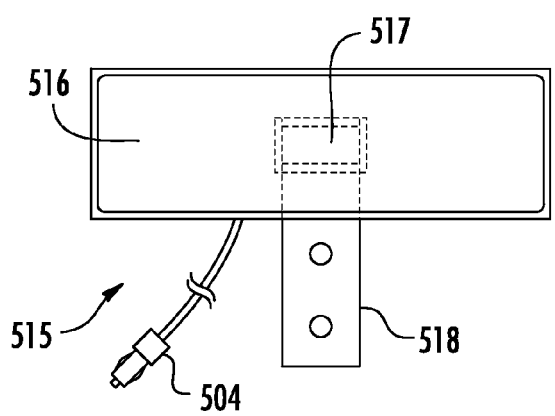
Figure 17D:
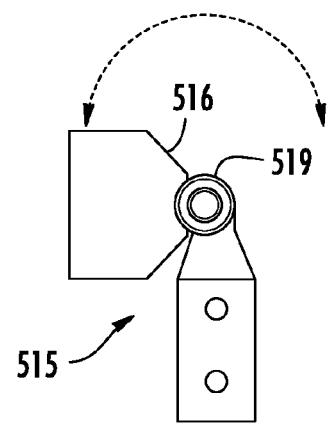

FIG. 17A shows Accessory A12A 500, a mountable light. Accessory A12A 500 has a bulb 502, a lens 501, a connector 504, and a mounting member 503. FIG. 17B shows Accessory A12B 510, an alternative embodiment mountable light. Accessory A12B 510 has a connector 504, a light assembly 513, a goose neck 512, and a mounting member 511. FIGS. 17O and 17D show Accessory A12C 515, an alternative embodiment light. Accessory A12C 515 has a housing assembly 516, a connector 504, a light element 517, a hinge 519, and a mounting member 518. All of the light 500, 510, 515 mounting members 503, 511, 518, can mate with one or more standard Building Blocks 1, 10, 15, 20, 25, 30, 31.

Figure 18A:
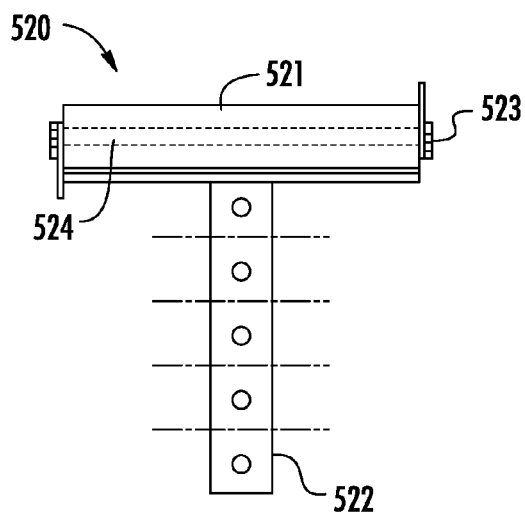
FIG. 18A-18B are front views of a Pulley Accessories.
Figure 18B:
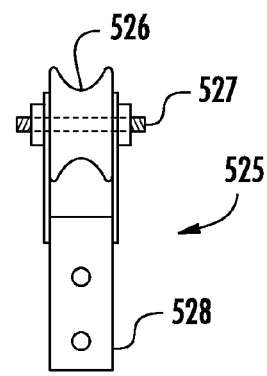
Figure 18C:
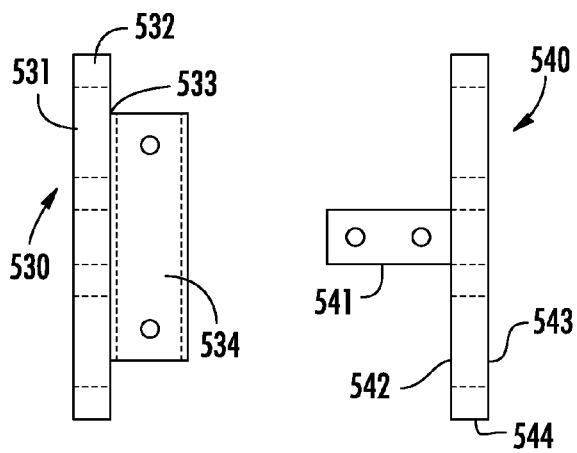
FIG. 18C is a front view of a Platform Accessory.
Figure 18D:
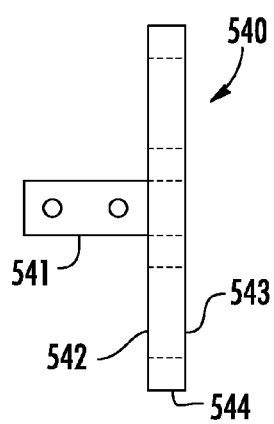
FIG. 18D is a side view of a Platform Accessory.
Figure 18E:
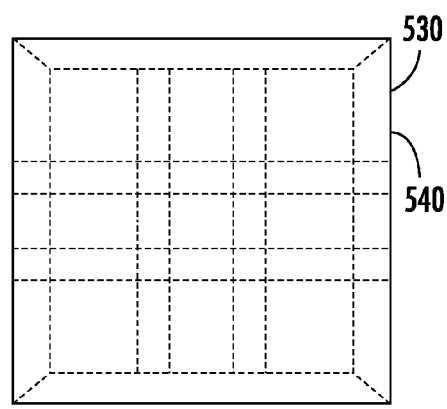
FIG. 18E is a top view of a Platform Accessory.
Figure 18F:
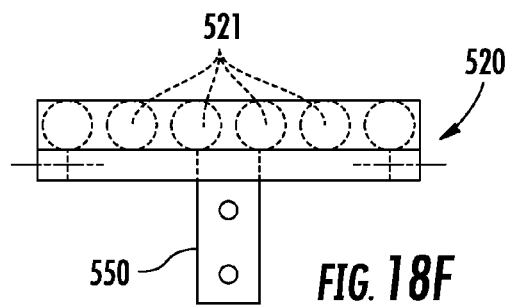
FIG. 18F is a side view of a Conveyor Accessory.

FIGS. 18A and 18F show Accessory A13A 520, a roller. Accessory A13A 520 has a roller 521, an axle hub 523, an axle 524, and a support member 522, 550 (two sides of the same member). The member 522, 550 couples with one or more standard Building Blocks 1, 10, 15, 20, 25, 30, 31. FIG. 18B shows Accessory 14 525, a simple pulley wheel. Accessory A14 525 has a wheel 526, an axle 527, and a supporting member 528. The member 528 couples with one or more standard Building Blocks 1, 10, 15, 20, 25, 30, 31.

FIGS. 18O-18E shows Accessory A15 530, 540, a platform, with alternative mounting hardware. In one embodiment 530, the mounting member is a horizontal Female Building Block 534, which is durably connected to the under-surface 531 of the platform 530. The top surface 531, and side surface 532 are also visible. In the other embodiment 540, the mounting member is a vertical Male Building Block 541, durably connected to the under-surface 542 of the platform 540. The top surface 543 and side surface 544 are also visible. FIG. 18E shows a representative top of the platform 530, 540.

Drawings 20-26 show various concepts for assembling a variety of Building Blocks 1, 10, 15, 20, 25, 30, 31, 600, 610, Connectors 1, 5, 110, 120, 130, 140, 146, 151, 155, 160, 165, 175, 180, Extenders 60, 65, 70, and Accessories 230, 251, 260, 270, 280, 301, 320, 340, 360, 370, 400, 450, 470, 480, 485, 500, 510, 515, 520, 525, 530, 540. FIG. 20A shows a winch 301 with a Connector 130, three Extenders 60, 65, 70, and a plurality of Female Building Blocks 10. The Female Building Block 10 at the bottom would easily mate with a male hitch 200. FIG. 20B shows an alternative embodiment winch 331, which would fit over the top of a Connector 130. FIG. 20C shows an alternative embodiment winch mounted with a Female Building Block 330 so that it can mate with an Extender 70.

Figure 20F:
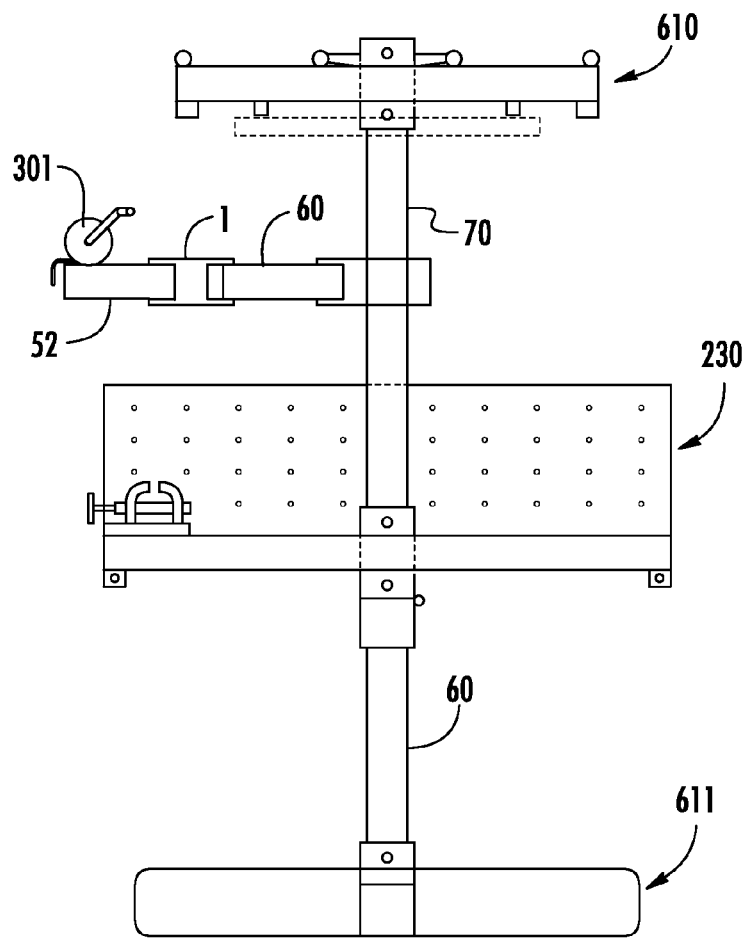
Figure 20G:
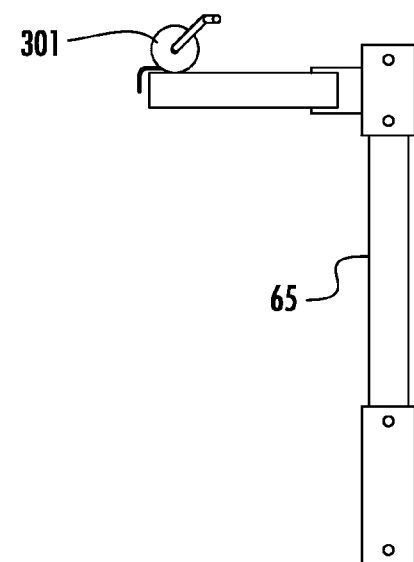
Figure 20H:
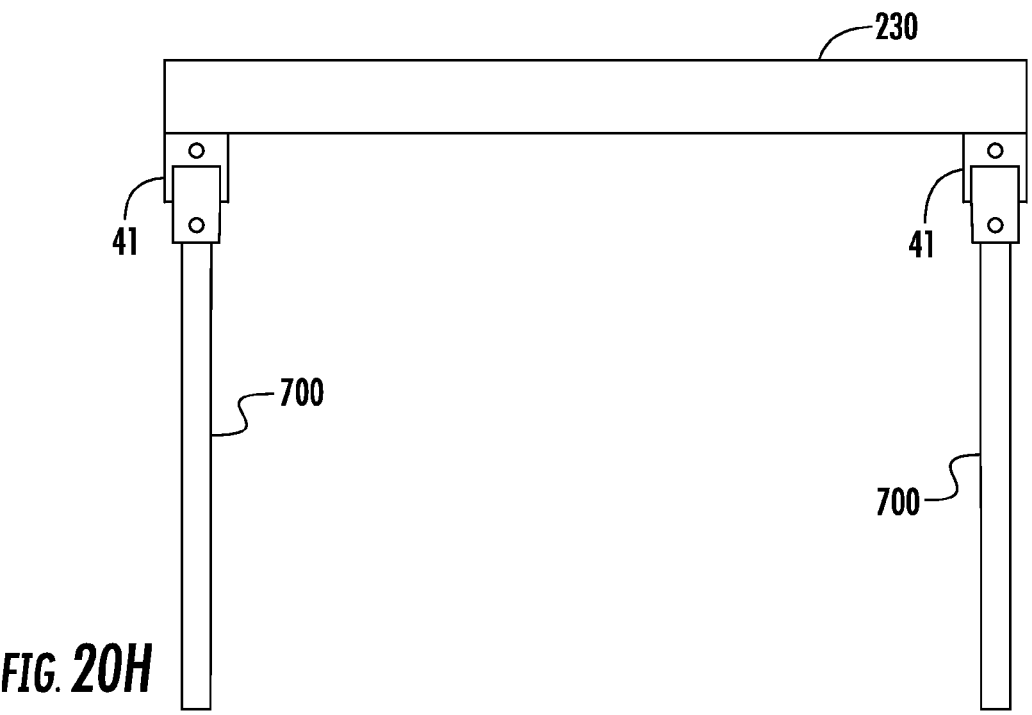
Figure 20I:
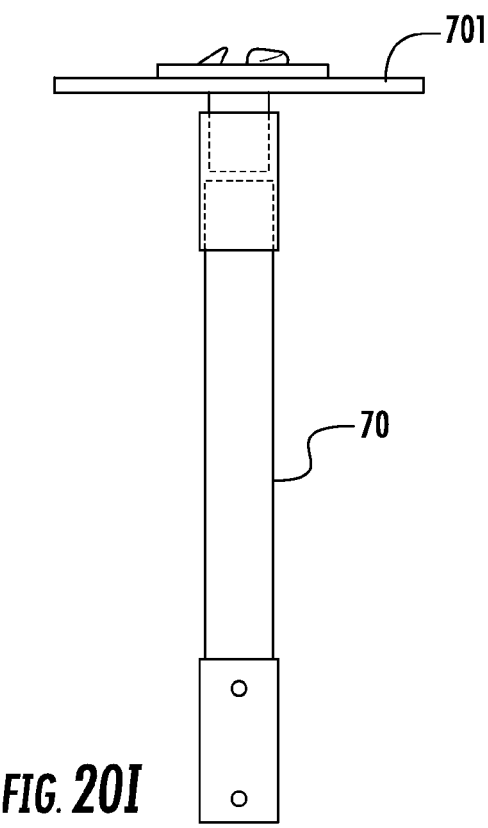

FIG. 20D shows a mounting configuration containing a winch 301, a firm fixed foot 190, with a plurality of Extenders 70, 65, Connectors 110, and an anchor shaft 52. FIG. 20E has a plurality of Extenders 70, 60, anchor shafts 52, Female Building Block/Connector 1, and a rigid quad "T" Connector 620 not previously described. FIG. 20F has a base 611, a plurality of Extenders 70, 60, an anchor shaft 52, Female Building Block/Connector 1, an Open Channel Building Block 610, supporting a work bench 230, and a winch 301. FIG. 20G has a winch 301 supported, inter alia, by an Extender 65. FIG. 20H shows a bench 230, supported by lumber 700, and two Lumber Adapters 41. FIG. 20I shows a chain saw sharpener 701 supported, inter alia, by Extender 70.

Figure 21:
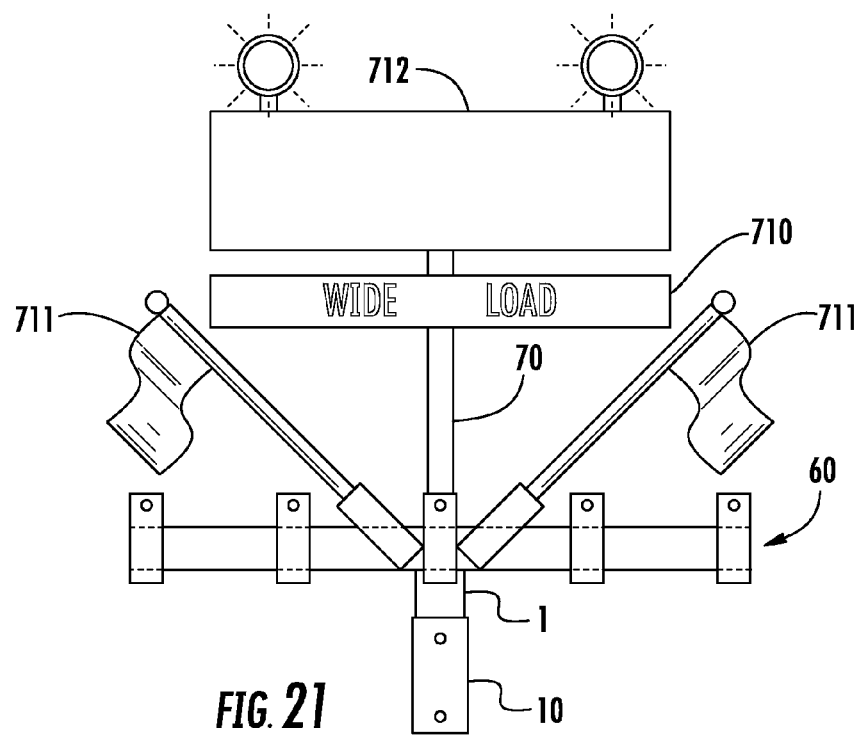
FIG. 21 is a front view of a light and sign bar assembled from Building Blocks, Connectors, Extenders, and Accessories.
Figure 22:
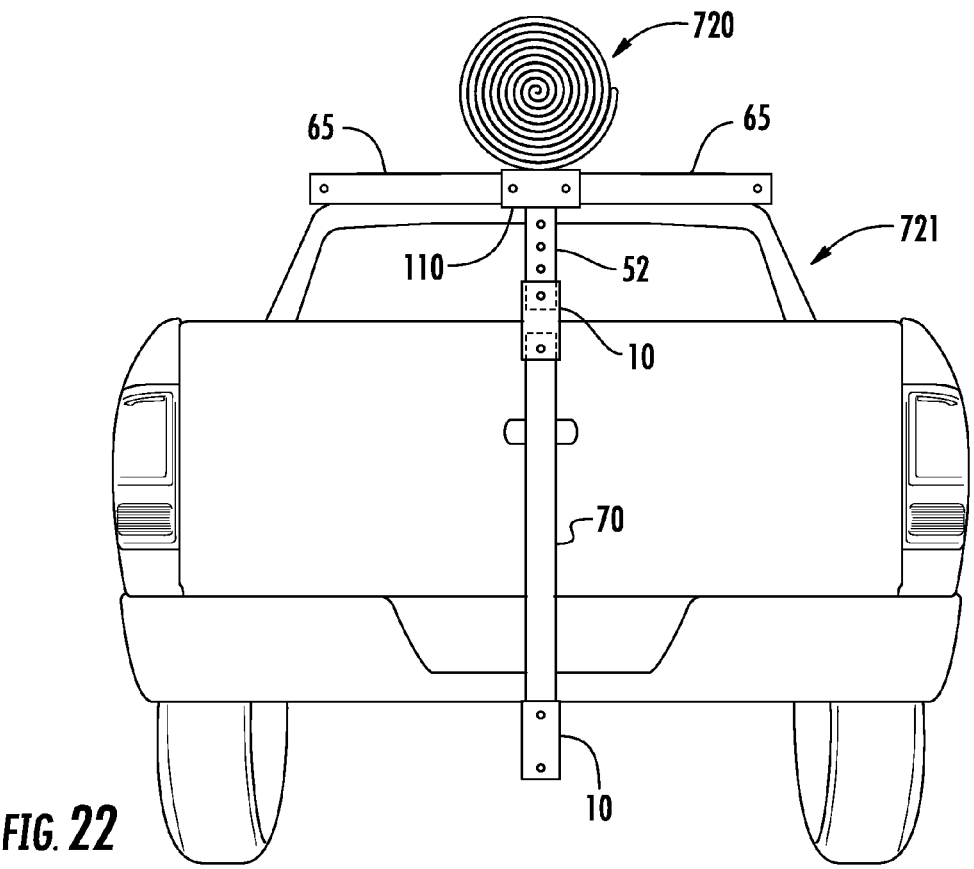
FIG. 22 is a front view of an alternative embodiment light and sign bar, in situ.
Figure 23:
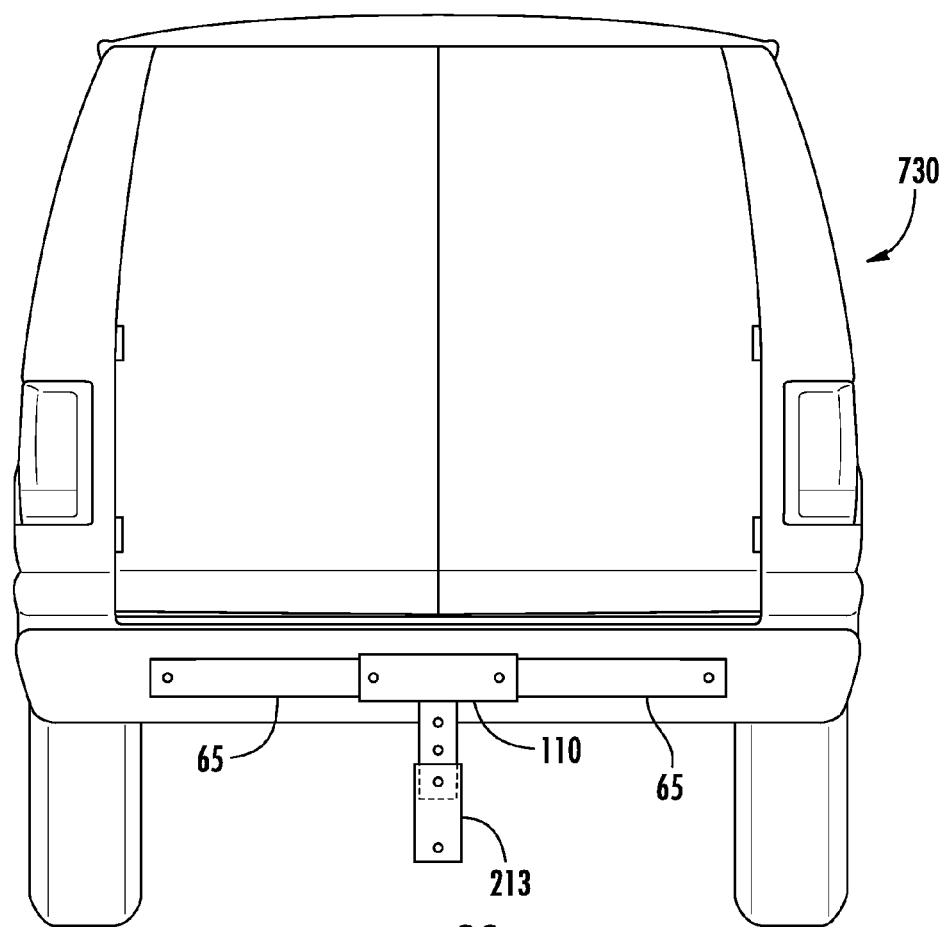
FIG. 23 shows a cargo hitch adapter with various Connectors and Extenders, mounted in situ.
Figure 24:
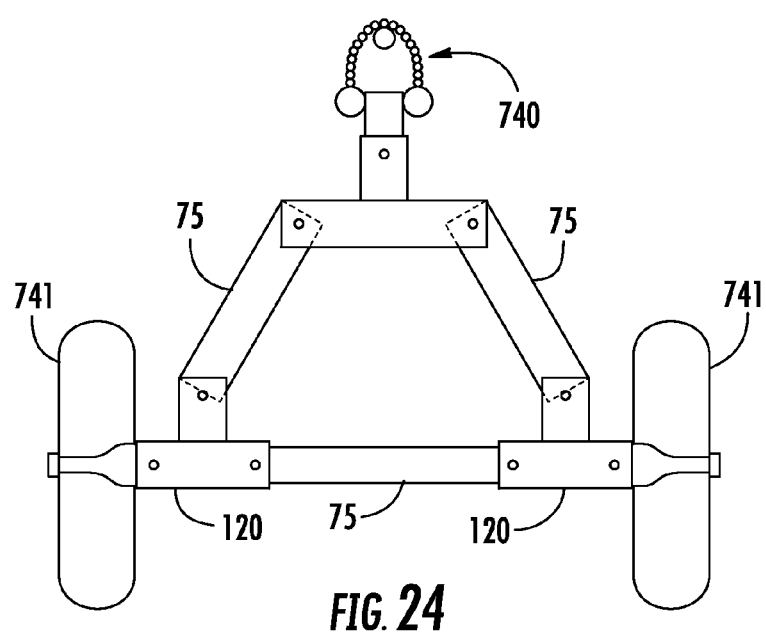
FIG. 24-25 shows a top views of alternative embodiment modular carts built using Building Blocks, Connectors, Extenders, and Accessories.
Figure 25:
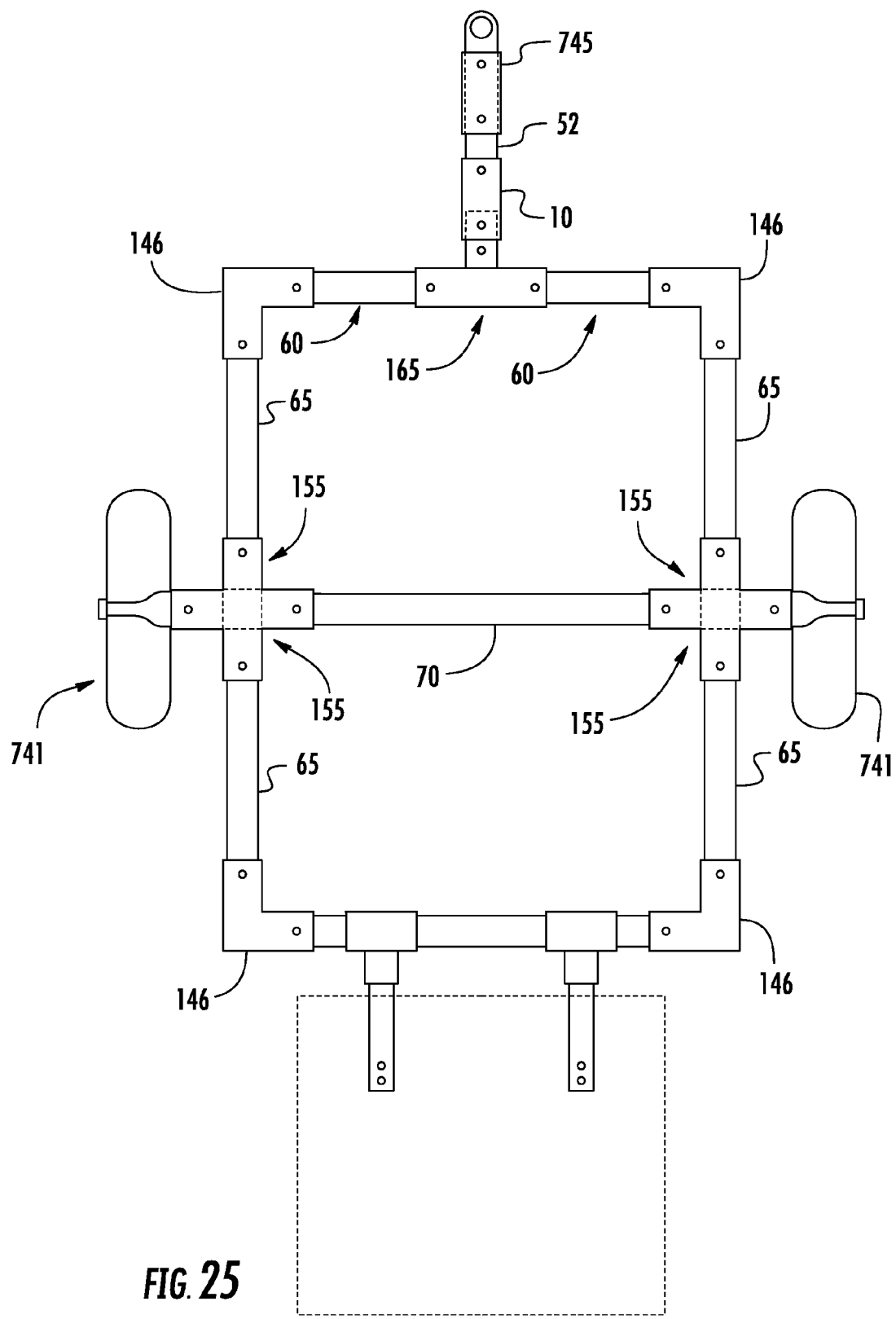
Figure 26:
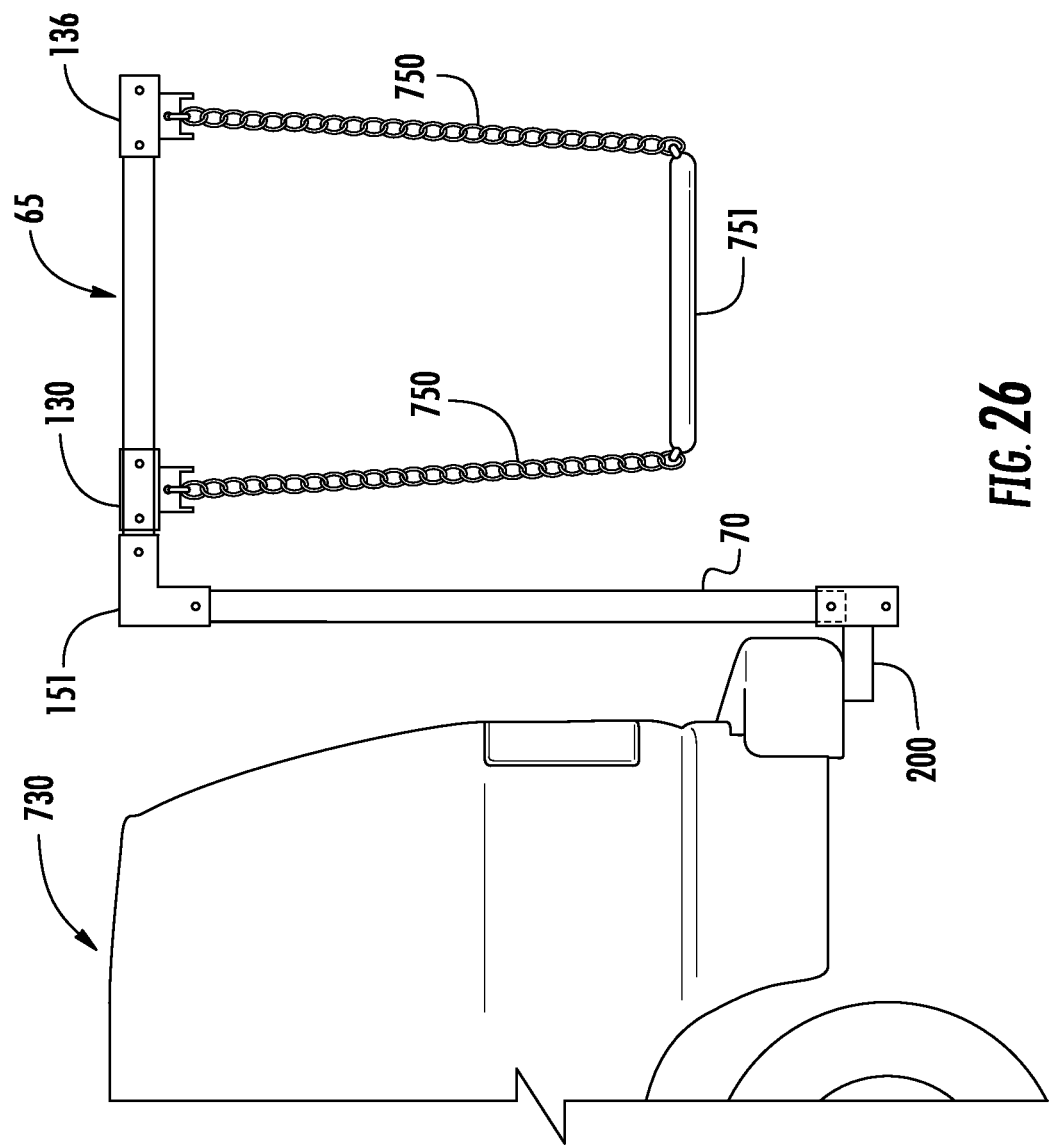
FIG. 26 shows a side view of a suspended swing or platform, in situ, built using Building Blocks, Connectors, Extenders, and Accessories.

FIG. 21 shows a support for lights 712, sign 710, and flags 711, constructed from Extenders 60, 70, and Female Building Blocks 1, 10, inter alia. FIG. 22 shows a carpet 720 support, in situ, attached to a pick-up truck 721. The support is constructed from Extenders 65, 70, Connectors 110, Female Building Blocks/Couplers 10, and anchor shaft 52. FIG. 23 shows a Ramp Accessory 340 support, constructed from Extenders 65, Connectors 110, and hitch receiver 213. FIG. 24 shows a lumber drag trailer comprised of tire assemblies 741, Extenders 75, a plurality of Connectors 120, and a hitch ball chain 740, inter alia. FIG. 26 shows a trailer frame comprising tire assemblies 741, Extenders 70, 65, 60, a plurality of Connectors 10, 146, 165, 155, a hitch anchor shaft 52, and a hitch ball connector 745, inter alia. FIG. 26 shows a swing mounted, in situ, to a van 730, comprising a hitch 200, Extenders 70, 65, Connectors 130, 136, chains 750, and a platform 751, inter alia.

FIGS. 20-26 illustrate how Building Blocks, Connectors, Extenders, Lumber Adapters, Hitches, Hitch Anchor Shafts, and Accessories can be combined, in the field, to create a wide variety of utility solutions.

I claim:

1. A modular trailer-hitch utility system comprising:
a plurality of Female Building Blocks, said Female Building Blocks being durably constructed from 2½"×2½" square tubing, each Female Building Block having four connected surfaces with a substantially square cross-section, and two open ends opposed to one another;
a plurality of Male Building Blocks, said Male Building Blocks being durably constructed from 2"×2" square tubing each Male Building Block having four connected surfaces with a substantially square cross-section, and two open ends opposed to one another and each said Male Building Block being sized to nest or mate inside of said Female Building Blocks;
a plurality of Connectors being constructed, temporarily or permanently, from at least one of a Female Building Block and a Male Building Block;
said Connectors being configurable in "L", "T", and "X" configurations, wherein the "L" connector configuration is comprised of two or more of a Female Building Block and a Male Building Block arranged to have two openings, with the two open ends orthogonal to one another; the "T" connector configuration is comprised of at least two of a Female Building Block and a Male Building Block arranged to have three openings, with two of the openings being orthogonal to the third opening; and the "X" connector configuration is comprised of at least two of a Female Building Block and a Male Building Block arranged to have four exposed openings, with each of the four openings being orthogonal to two of the other openings; and,
wherein the connections made by said "L", "T", or "X" configurations are either fixed rigid, or pivotable;
a plurality of Extenders, said Extenders being durably constructed, each said Extender being sized to either nest inside a Female Building Block, or fit over a Male Building Block;
wherein at least one of a Female Building Block, a Male Building Block, a Connector, and an Extender can mate and nest inside a hitch receiver;
and wherein more than one of a Male Building Blocks, said a Female Building Blocks, a Connectors, and an Extenders can be temporarily connected to create one structural members that can do at least one of extend parallel with the hitch, extend orthogonal to the hitch, extend both parallel and orthogonal to the hitch, pivot about one connection, and articulate by pivoting around more than one connection.

2. The modular trailer-hitch utility system in claim 1, further comprising hitch pins, wherein the Female Building Blocks, the Male Building Blocks, the Connectors, and the Extenders have through-holes sized to said fit hitch pins; and wherein the Female Building Blocks, the Male Building Blocks, the Connectors, and the Extenders are capable of being temporarily joined or mated, using the hitch pins, with at least two of Female Building Blocks, Male Building Blocks, Connectors, and Extenders.

3. The modular trailer-hitch utility system in claim 2, wherein the through-holes are positioned on the Female Building Blocks, the Male Building Blocks, the Connectors, and the Extenders so that some hole combinations allow two joined components to pivot, while other hole combinations rigidly fix the two joined components.

4. The modular trailer-hitch utility system in claim 1, further comprising wedge-shaped shims, inserted between at least two of Female Building Blocks, Male Building Blocks, Connectors, and Extenders to provide stability and sufficient force-fit.

5. The modular trailer-hitch utility system in claim 1, further comprising Lumber Adapters, wherein the Lumber Adapters are durably constructed; are sized to either nest inside a Female Building Block, or fit over a Male Building Block; and are sized to accept, and mate with structural lumber members.

6. The modular trailer-hitch utility system in claim 1, further comprising Hitch Anchor Shaft wherein the Hitch Anchor Shaft is durably constructed, is sized to fit in a hitch receivers.

7. The modular trailer-hitch utility system in claim 6, wherein the Female Building Blocks, the Male Building Blocks, the Connectors, the Extenders, the Lumber Adapters, and the Hitch Anchor Shafts are constructed from at least one of steel, aluminum, polycarbonate, polypropylene, and high-density polyethylene ("HDPE").

8. The modular trailer-hitch utility system in claim 1, further comprising a lighting accessory, wherein the lighting accessory has a base that securely nests over, and is securely supported by at least one of a Female Building Block, a Male Building Block, a Connector, and an Extender.

9. The modular trailer-hitch utility system in claim 1, further comprising a ramp accessory, wherein the ramp accessory has a support base that is supported by the trailer hitch through at least one cross member constructed from at least one of a Female Building Blocks, a Male Building Blocks, a Connectors, and an Extenders.

10. The modular trailer-hitch utility system in claim 1, further comprising a work bench accessory, wherein the work bench accessory has at least one opening to mate with at least one of a Female Building Block, Male Building Block, Connector, or Extender, and wherein the work bench accessory is supported by the trailer hitch through at least one cross member constructed from at least one of a Female Building Block, a Male Building Block, a Connector, and an Extender.

11. The modular trailer-hitch utility system in claim 1, further comprising a step accessory, wherein the step accessory has at least one member to mate with at least one of a Female Building Blocks, a Male Building Blocks, a Connectors, and an Extenders, and wherein the step accessory is supported by the trailer hitch through at least one of a cross member, and an extension member, constructed from at least one of a Female Building Blocks, a Male Building Blocks, a Connectors, and an Extenders.

12. The modular trailer-hitch utility system in claim 1, further comprising a seat accessory, wherein the seat accessory has at least one member to mate with at least one Female Building Block, Male Building Block, Connector, and Extender, and wherein the seat accessory is supported by the trailer hitch through at least one of a cross member, and extension member, constructed from at least one of a Female Building Block, a Male Building Block, a Connector, and an Extender.

13. The modular trailer-hitch utility system in claim 1, further comprising a pulley accessory, suitable for lifting a load with at least one of a rope and cable, wherein the pulley accessory has at least one member to mate with at least one of a Female Building Block, a Male Building Block, a Connector, and an Extenders, and wherein the pulley accessory is supported by the trailer hitch through at least one of cross members, and extension members, constructed from at least one of a Female Building Block, a Male Building Block, a Connector, and an Extender.

14. The modular trailer-hitch utility system in claim 1, further comprising a winch accessory capable of lifting and pulling a load with at least one of a rope and cable, wherein the winch accessory has at least one member to mate with at least one of a Female Building Block, a Male Building Block, a Connector, and an Extender, and wherein the winch accessory is supported by the trailer hitch through at least one of cross member and extension member, constructed from at least one of a Female Building Block, a Male Building Block, a Connector and an Extender.

15. The modular trailer-hitch utility system in claim 1, further comprising a rack accessory, capable of holding at least one of shelves, poles, and wires, wherein the rack accessory has at least one member to mate with at least one of a Female Building Block, a Male Building Block, a Connector, and an Extender, and wherein the rack accessory is supported by the trailer hitch through at least one of a cross member and an extension member, constructed from at least one of a Female Building Block, a Male Building Block, a Connector, and an Extender.

16. The modular trailer-hitch utility system in claim 1, further comprising a barrier accessory, capable of concealing and protecting a user, wherein the barrier accessory has at least one member to mate with at least one of a Female Building Block, a Male Building Block, a Connector, and an Extender, and wherein the barrier accessory is supported by the trailer hitch through at least one of a cross member and an extension member, constructed from at least one of a Female Building Block, a Male Building Block, a Connector, and an Extender.

17. The modular trailer-hitch utility system in claim 1, further comprising a cargo carrier accessory, capable of holding cargo, wherein the cargo carrier has a frame with at least one of an opening and a member to mate with at least one of a Female Building Block, a Male Building Block, a Connector, and an Extender, and wherein the cargo carrier is supported by the trailer hitch through at least one of a cross member and an extension member, constructed from at least one of a Female Building Block, a Male Building Block, a Connector, and an Extender.

18. The modular trailer-hitch utility system in claim 1, further comprising a roller accessory, suitable for rolling loads, wherein the roller accessory has at least one member to mate with at least one of a Female Building Block, a Male Building Block, a Connector, and an Extender, and wherein the roller accessory is supported by the trailer hitch through at least one of a cross member and an extension member, constructed from at least one of a Female Building Block, a Male Building Block, a Connector, and an Extender.

19. The modular trailer-hitch utility system in claim 1, further comprising a platform accessory, wherein the platform accessory has flat platform surface permanently bonded to at least one member to mate with at least one of a Female Building Block, a Male Building Block, a Connector, and an Extender, wherein the platform accessory is supported by the trailer hitch through at least one of a cross member and an extension member, constructed from at least one of a Female Building Block, a Male Building Block, a Connector, and an Extender.

20. The modular trailer-hitch utility system in claim 1, further comprising a wheel assembly accessory, wherein the wheel assembly accessory is comprised of a tire, a rim, bearings, an axle, and an axle housing wherein said axle housing can be mated, using hitch pins, to a member constructed from at least one of a Female Building Block, a Male Building Block, a Connector, and an Extender.

21. The modular trailer-hitch utility system in claim 20, wherein a modular trailer can be temporarily constructed, said modular trailer comprising a plurality of wheel assemblies, Female Building Blocks, Male Building Blocks, Connectors, and Extenders.

22. The modular trailer-hitch utility system in claim 1, further comprising a plurality of Open Channel Building Blocks, durably constructed so that the Open Channel Building Blocks are a two-dimensional surface, folded or rolled into three dimensions, that does not enclose any volume; and wherein the Open Channel Building Block is sized to snuggly nest over Male Building Blocks.

* * * * *